(12) United States Patent
Thorne et al.

(10) Patent No.: US 11,653,644 B2
(45) Date of Patent: May 23, 2023

(54) SYSTEM FOR RAPID COOLING AND WARMING OF CELLS AND OTHER BIOLOGICAL MATERIAL

(71) Applicant: Mitegen, LLC, Ithaca, NY (US)

(72) Inventors: Robert Thorne, Ithaca, NY (US); David Closs, Freeville, NY (US); Richard Jayne, Lansing, NY (US); Benjamin Apker, Ithaca, NY (US)

(73) Assignee: MITeGen, LLC, Ithaca, NY (US)

( * ) Notice: Subject to any disclaimer, the term of this patent is extended or adjusted under 35 U.S.C. 154(b) by 0 days.

(21) Appl. No.: 17/056,796

(22) PCT Filed: May 22, 2019

(86) PCT No.: PCT/US2019/033466
§ 371 (c)(1),
(2) Date: Nov. 19, 2020

(87) PCT Pub. No.: WO2019/226738
PCT Pub. Date: Nov. 28, 2019

(65) Prior Publication Data
US 2021/0195889 A1   Jul. 1, 2021

Related U.S. Application Data

(60) Provisional application No. 62/674,971, filed on May 22, 2018.

(51) Int. Cl.
*A01N 1/02* (2006.01)
*G01N 1/42* (2006.01)

(52) U.S. Cl.
CPC ............. *A01N 1/0242* (2013.01); *G01N 1/42* (2013.01)

(58) Field of Classification Search
CPC .................. A01N 1/0242; G01N 1/42; B01J 2219/00596; B01J 2219/00659; B01J 2219/00722; B01J 19/0046; B01L 7/52
(Continued)

(56) References Cited

U.S. PATENT DOCUMENTS

| 4,534,818 A | * | 8/1985 | Kreager | ............ B29C 66/81431 156/466 |
| 5,715,686 A | | 2/1998 | Arav | |

(Continued)

FOREIGN PATENT DOCUMENTS

| WO | 2007123720 A2 | 11/2007 |
| WO | 2011070973 A1 | 4/2013 |

(Continued)

OTHER PUBLICATIONS

International Search Report and Written Opinion for International Application No. PCT/US2019/033466 dated Aug. 9, 2019; 7 pages.

(Continued)

*Primary Examiner* — Michael L Hobbs
*Assistant Examiner* — Lenora A Abel
(74) *Attorney, Agent, or Firm* — Quinn IP Law

(57) ABSTRACT

A system for cryocooling biological samples, including a first chamber configured to hold a first amount a cryogenic liquid; a container holder positioned in thermal contact with the first chamber and configured to hold at least one removable container positioned therein, wherein the container is configured to hold a second amount of the cryogenic liquid and forms a second chamber; an elongated tube holder configured to hold at least one hollow elongated tube into the container; and a sample wand configured to hold and transfer at least one sample holder with a biological sample into (Continued)

the elongated tube while the elongated tube is in the container with the second amount of the cryogenic liquid therein.

21 Claims, 17 Drawing Sheets

(58) Field of Classification Search
USPC .............................................................. 435/2
See application file for complete search history.

(56) References Cited

U.S. PATENT DOCUMENTS

| | | | |
|---|---|---|---|
| 7,263,162 B2* | 8/2007 | Thorne | C30B 29/58 |
| | | | 250/440.11 |
| 7,547,416 B2* | 6/2009 | Lihl | F25D 3/10 |
| | | | 118/429 |
| 9,297,499 B2* | 3/2016 | Jimenez-Rios | F25D 3/10 |
| 9,417,166 B2* | 8/2016 | Thorne | A01N 1/0268 |
| 2006/0046243 A1* | 3/2006 | Stachecki | A01N 1/0221 |
| | | | 435/1.3 |
| 2009/0186405 A1* | 7/2009 | Chin | G01N 1/42 |
| | | | 435/307.1 |
| 2013/0263622 A1* | 10/2013 | Mullen | B01L 7/04 |
| | | | 62/451 |
| 2017/0030626 A1 | 2/2017 | Closs et al. | |

FOREIGN PATENT DOCUMENTS

| | | |
|---|---|---|
| WO | 2015115313 A1 | 8/2015 |
| WO | 2016016886 A1 | 2/2016 |

OTHER PUBLICATIONS

The extended European search report for an international application No. EP19808340, dated Feb. 17, 2022.

* cited by examiner

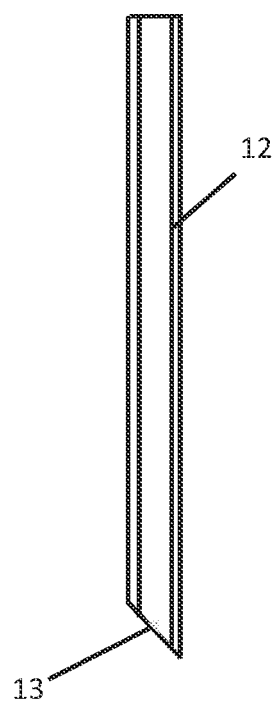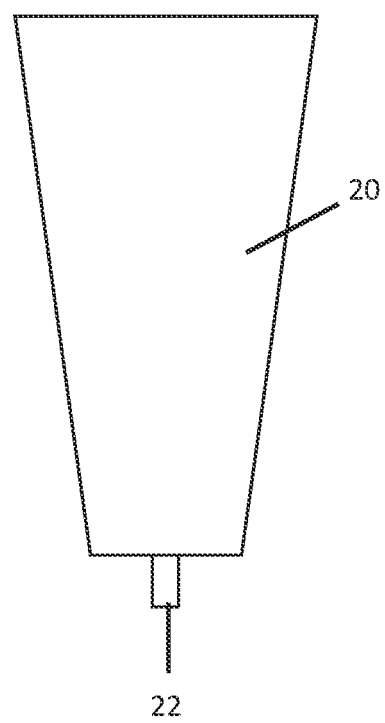
FIG. 2A
FIG. 2B

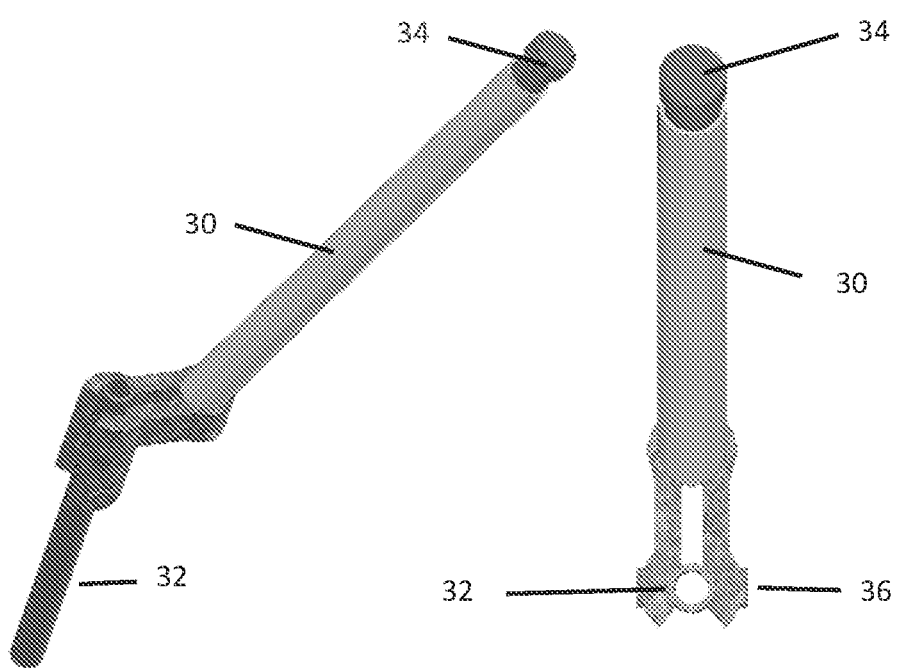

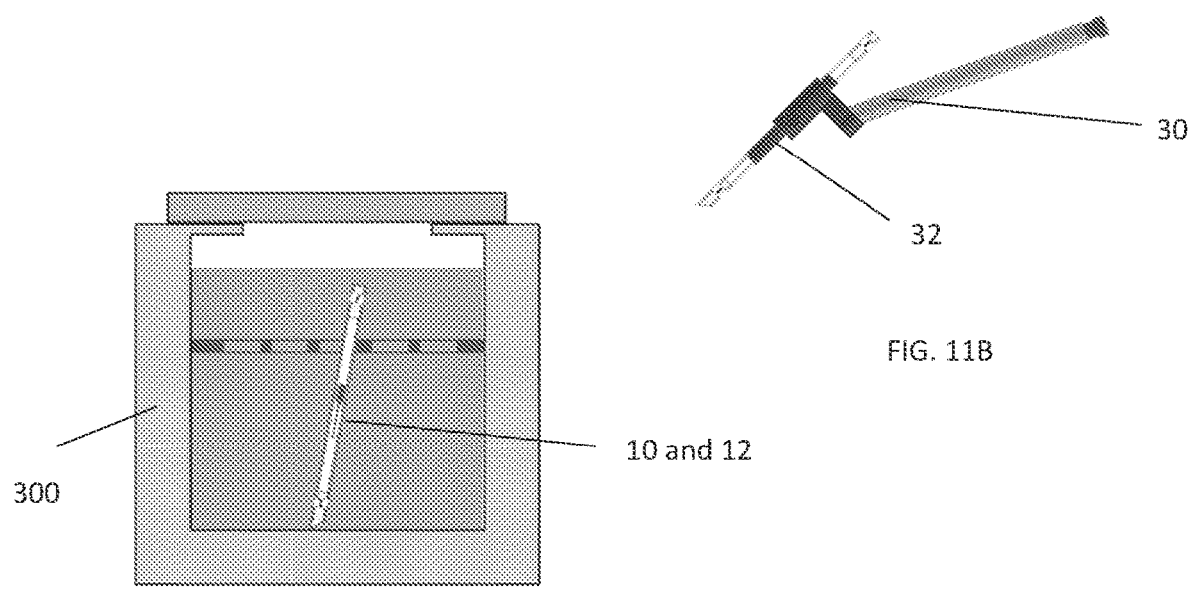
Fig. 11A
FIG. 11B
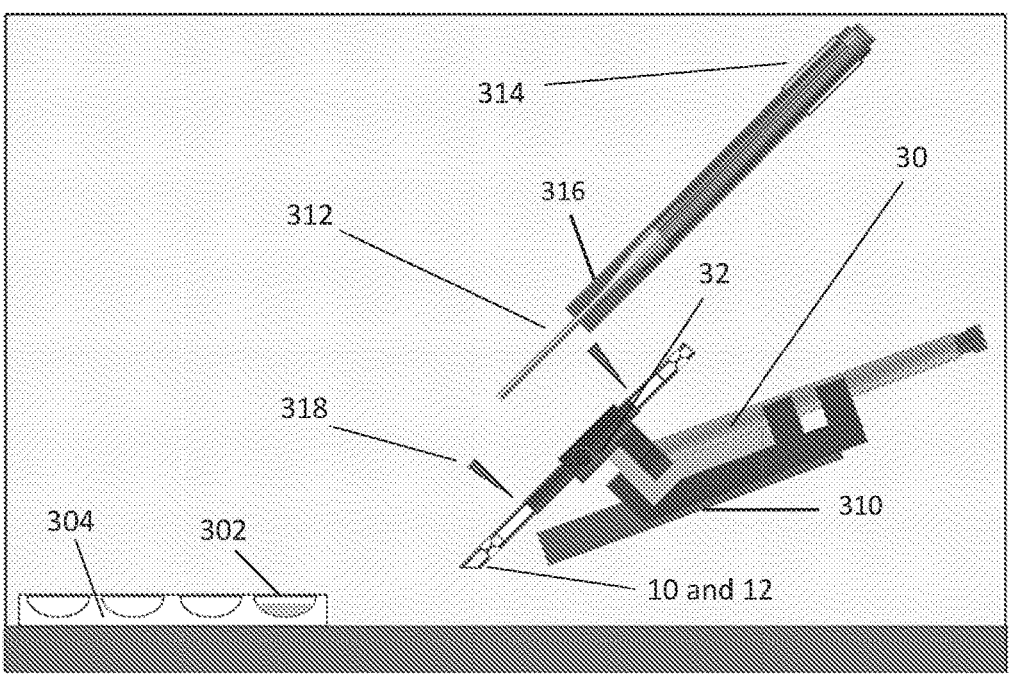
FIG. 11C

SYSTEM FOR RAPID COOLING AND WARMING OF CELLS AND OTHER BIOLOGICAL MATERIAL

CROSS REFERENCE

This application is a U.S. National Phase filing of International Application No. PCT/US19/33466 filed May 22, 2019, which claims priority to U.S. Provisional Patent Application Ser. No. 62/674,971, filed on May 22, 2018 and entitled "System for Rapid Cooling and Warming of Cells and other Biological Material," the entirety of each of which are incorporated herein by reference.

BACKGROUND OF THE INVENTION

1. Field of the Invention

The invention pertains to the field of biotechnology. More particularly, the invention pertains to the design of systems for rapid cooling and warming of small biological samples. This includes the rapid cooling and warming of eggs, embryos, blastocysts, and sperm in assisted reproduction of humans and other animals.

2. Description of Related Art

Sample Cooling and Thawing in Assisted Reproduction

Eggs, embryos, blastocysts, and sperm are routinely frozen, stored at cryogenic temperature, and then thawed for use in assisted reproduction. Until about a decade ago, these samples were soaked in cryoprotectant/vitrification solutions, slowly cooled (over 20 minutes to 2 hours) to an intermediate temperature (say, −40° C.), and then dropped into liquid nitrogen for long term storage. During the slow cooling step, ice nucleated outside the cells, and growth of this ice drew water out of the cells, increasing the concentration of protein and other solutes within the cells. As cooling and water removal continued, eventually the solvent inside the cells vitrified. To warm the samples, they were placed in a warm aqueous solution. Although embryos and blastocysts containing many cells could be frozen and then thawed with high survival rates, individual eggs could not.

In current practice, most eggs and embryos are cooled using so-called vitrification or fast cooling methods. In these methods, the sample is placed on a plastic holder, and this holder is then either directly plunged in liquid nitrogen, or else plunged into a cold "straw" that is surrounded by liquid nitrogen. In the former case, the sample directly touches liquid nitrogen, and since different samples come in contact with the same liquid nitrogen, there is the possibility of contamination or sample mix-up. This "open system" approach, although widely practiced, is less desirable than the "closed system" approach, in which each sample is completely isolated from materials that come in contact with other samples, eliminating the chance of cross-contamination. The use of these "vitrification" approaches has dramatically improved survival of individual eggs, allowing easy egg donation and reliable banking of eggs; genetic testing, cryostorage, and then fertilization and implantation in a later reproductive cycle, and reproductive pauses for women who wish to delay childbearing without the increased risks of degraded egg quality and reduced chances of reproductive success that such delays typically cause.

Human eggs and embryos have typical sizes of 100 micrometers. Current cooling rates reported for open systems (where samples are directly plunged into liquid nitrogen) are in the range of 500 K/s. For closed systems (in which the sample is encased in a straw or other container that comes into contact with liquid nitrogen), the largest reported rates are roughly 20 K/s. This can be compared with cooling rates achieved using current best practice methods in, e.g., cryocrystallography for samples of 100 micrometer size of roughly 20,000 K/s.

For thawing, a frozen sample is plunged directly into a well of solution at room temperature, so that the sample (egg, embryo, etc.) is in direct contact with the solution, regardless of whether the cooling was done using an open or closed configuration. Cross-contamination is prevented by using a different well and solution for each sample.

Cooling and Warming-Induced Sample Damage

During cooling, samples may be damaged by several mechanisms. First, ice may nucleate and grow inside the cells. This ice can puncture cell membranes and disrupt the cell's internal organization. Second, all solutes are rejected from the growing ice crystals, and so become concentrated in the remaining solution. This can lead to protein aggregation. Third, the solution inside the cell may expand or contract more than the other cell components, causing cell damage by mechanical stresses. Fourth, proteins change their conformation and often unfold as they are cooled (a process called cold denaturation), due to the temperature dependence of the hydrophobic interaction that drives folding, as well as of pH, pKa, and may other physico-chemical properties. Their solubility is also temperature dependent. As a result, proteins may aggregate and other biomolecular changes that may be irreversible may occur during cooling.

Cryoprotectants are added to reduce ice formation. At the cooling rates used in current ART practice, large concentrations—of order 40% w/v—of cryoprotectants are needed to prevent ice formation, and these are present in commercial vitrification solutions. To prevent cell damage by osmotic shock, the cells must be soaked in a series of solutions with increasing cryoprotectant concentrations, a slow and time consuming process. Moreover, because of the large cryoprotectant concentrations, the vitrification solutions contract a lot—by perhaps 5%—on cooling from room temperature to 77 K, and so may cause mechanical stress.

Ideally, cooling of the sample leaves the solvent inside and outside the sample in a vitrified or glassy or amorphous state. During warming or thawing of the sample, the vitrified solvent develops some molecular mobility above the solvent's glass transition temperature—typically between 140 and 180 K. Ice can then nucleate and grow, and the growth rate increases with temperature as the solvent molecules become more and more mobile. As a result, samples are often observed to "flash white" during warming, as ice rapidly forms during warming before melting near 273 K. Warming rates required to prevent the formation of a significant (say, 5%) ice fraction during warming are generally much larger—by perhaps two orders of magnitude—than cooling rates required to prevent significant ice formation during cooling. Consequently, there is evidence that warming rates rather than cooling rates have large negative impacts on sample quality and egg/embryo survival. However, experiments also show that the extent of ice formation during warming, and the warming rates required to minimize ice formation, depend strongly on the rate at which the sample was cooled to low temperatures. This is believed to result because large number of tiny ice nuclei are generated on cooling, but these fail to grow to appreciable size on cooling because growth rates drop rapidly with decreasing temperature. But on warming, these ice nuclei grow rapidly as temperature rises, producing a much larger ice fraction than developed on cooling.

All of these considerations argue for cooling and warming at the absolute fastest possible rates in order to minimize ice formation, protein conformation changes and aggregation, and cell damage during cryopreservation and recovery of cells.

Critique of Current Cryopreservation Tools and Protocols Used in Assisted Reproduction.

Current cryopreservation tools and methods used in assisted reproduction do a poor job of maximizing cooling and warming rates and of preventing ice formation and other forms of damage. One example of current tools is the Rapid-I system. First, samples are soaked in a series of solutions to increase their cryoprotectant concentration to a large value. Then the samples are deposited onto a 0.5-1 mm thick piece of plastic, or into a hole in a piece of plastic of this thickness, along with a volume of liquid that is typically many times the egg or embryo volume. The total mass of liquid and sample holder that must be cooled along with the egg or embryo is large. The samples are then plunged into a pre-cooled straw, giving cooling rates of only 20 K/s (1200 K/min.) The top of the straw is then sealed, and the straw is transferred to a storage cane for storage in liquid nitrogen.

For warming, the sample is first transferred from a storage cane into a liquid nitrogen Dewar. The top of the straw is cut open, tweezers are used to extract the sample from the straw, and the sample is grabbed by hand. The sample is then moved by hand a distance of typically 1 meter from the liquid nitrogen Dewar to a solution-containing well in a multiwell plate under a microscope. Again, the large thermal mass of sample holder and surrounding liquid limits the warming rate of the cells. Furthermore, during transfer through room temperature air from the nitrogen Dewar to the multiwell plate, frost can form on the sample surface, which can nucleate ice within the sample as the sample warms, and the sample may warm up, at a much slower rate than occurs when immersed in liquid, and that may promote excess ice formation and cell damage.

Therefore, there is a need for systems for cooling and thawing small biological samples and related methods that overcome the associated problems/issues noted above.

Description of the Related Art Section Disclaimer: To the extent that specific patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY OF THE INVENTION

Embodiments of the present invention relate to the design, function and use of systems for cooling and thawing small biological samples. "Small" here means volumes smaller than 10 microliters and generally smaller than 1 microliter. Eggs, embryos, and blastocysts having up to 100 cells are primary targets, although stem cells, sperm cells, and many other kinds of cells in suitably small quantities may benefit from cryopreservation using the embodiments of the disclosed invention.

Embodiments of the present invention focus on "closed system" cooling, in which the materials used to cool each sample are used for and can come in contact only with that sample, although the cooling and warming devices can also be used in an open system configuration. Embodiments of the present invention focus on producing the fastest possible cooling and warming rates and on minimizing the opportunities for pre-cooling or thawing and resulting sample damage. Certain key principles in achieving cryopreservation performance improvements include, but are not limited to:

minimizing the thermal mass of sample+surrounding liquid+sample holder in contact with the sample, and maximizing direct contact of the sample with liquid nitrogen;

providing a humidified environment during handling prior to cooling to prevent sample damage due to dehydration;

cooling the sample by direct contact with liquid nitrogen, disposing of the liquid nitrogen and the container used to cool each sample and using fresh liquid nitrogen and a fresh container for the next sample;

enclosing the sample in a polymer capillary, using a polymer thickness and material that provides excellent optical clarity and possibly also UV transparency, to allow detailed examination of samples after they have been cooled and sealed in the capillary;

plunging the sample at high speed (of order 2 m/s) and removing the cold layer of gas that develops above the liquid nitrogen just prior to the plunge, to achieve the fastest possible heat transfer and cooling rates. The cold gas can precool the sample during the plunge and lower overall cooling rates. By removing the cold gas layer, cooling rates of a 50 micrometer thermocouple in liquid nitrogen in excess of 50,000 K/s—the largest cooling rates ever obtained in liquid nitrogen, have been reported. These fast cooling rates dramatically reduce ice formation, are more effective in kinetically trapping proteins and other biomolecules in their room temperature conformation; and reduce protein aggregation;

protecting the sample during all transfers cold/cryogenic or warm liquids using "tongs" that surround the sample with a large thermal mass so as to maintain the sample at nearly constant temperature during the transfers;

automating sample motions and handling as much as possible to maximize cooling and warming rates, maximize sample throughput, and to minimize opportunities for operator error and sample damage or mis-labeling; and reducing the concentration of cryoprotectants in the vitrification solutions used. This is feasible because of the much larger cooling and warming rates, for which smaller cryoprotectant concentrations are sufficient to prevent ice formation. It is desirable because this should reduce the time required to soak samples to the final concentrations, and because it should reduce the thermal contraction of the solutions on cooling, which should reduce mechanical damage to the sample.

BRIEF DESCRIPTION OF THE DRAWINGS

FIG. 2A is a schematic representation of a straw/capillary tube used to enclose the sample holders of FIGS. 1A-B according to an embodiment. The bottom of the tube has an angled cut as shown.

FIG. 2B is a schematic representation of a disposable cup, with an optional nipple or extension, used to hold liquid nitrogen according to an embodiment.

FIG. 3A is a schematic representation of a straw holder used to hold the straw/capillary tube of FIG. 2A, and to keep the straw and sample inside cold according to an embodiment.

FIG. 3B is another schematic representation of a straw holder shown in FIG. 3A according to an embodiment.

FIG. 5A is a schematic representation of a Cup Dewar filled with liquid nitrogen from another tank located above the Dewar according to an embodiment.

FIG. 5B is a schematic representation of an empty straw and straw holder mounted on vertical translation stage according to an embodiment. A disposable cup is shown placed in cup holder.

FIG. 5C is a schematic representation of a straw and straw holder translated down into the cup and cup holder according to an embodiment.

FIG. 5D is a schematic representation of a cup filled with liquid nitrogen according to an embodiment. In a preferable embodiment, the liquid nitrogen should be sterile.

FIG. 6A is a schematic representation of a sample holder attached to a wand mounted on a second vertical translation stage according to an embodiment.

FIG. 6B is a schematic representation of a cold gas above the liquid nitrogen in the cup being removed according to an embodiment.

FIG. 6C is a schematic representation showing the sample plunged into liquid nitrogen according to an embodiment.

FIG. 6D is a schematic representation of a sample holder being translated so that it is fully enclosed in the straw, away from the straw's ends according to an embodiment.

FIG. 7A is a schematic representation of jaws of an ultrasonic sealer moved into place, and the straw holder, straw and sample are translated upward so top end of straw is within the jaws according to an embodiment.

FIG. 7B is a schematic representation showing that after the top end of the straw is sealed, straw holder, straw and sample are translated upward until the bottom of the straw breaks the liquid nitrogen surface according to an embodiment.

FIG. 7C is a schematic representation showing detail of gas flow as straw breaks liquid nitrogen surface according to an embodiment.

FIG. 8A is a schematic representation of a bottom end of the straw sealed after all liquid nitrogen has drained out according to an embodiment.

FIG. 8B is a schematic representation showing an ultrasonic sealer jaws retracting, releasing the straw according to an embodiment.

FIG. 8C is a schematic representation showing the sample holder, straw, and straw holder removed from the cooler and sample holder and the straw immediately plunged in liquid nitrogen in a storage container according to an embodiment.

FIG. 9A is a schematic representation showing cutters cutting the nipple on the bottom of the disposable liquid nitrogen cup according to an embodiment.

FIG. 9B is a schematic representation showing liquid nitrogen draining out of cup into separate chamber from which it evaporates and is vented to the atmosphere according to an embodiment.

FIGS. 11A-C are schematic representations of the warming of cryocooled samples according to an embodiment.

FIG. 11A is a schematic representation showing samples inside straws being stored in liquid nitrogen according to an embodiment.

FIG. 11B is a schematic representation showing a straw and sample held in a straw holder. The straw holder jaws are cooled in liquid nitrogen, and then used to grab the straw and sample and transfer it to the warming device according to an embodiment.

FIG. 11C is a schematic representation showing a warming device according to one version of the present invention. The sample and straw are gripped by a cold straw holder jaws, and the straw holders are mounted on a thermally insulated translation stage according to an embodiment.

FIG. 12A is a schematic representation showing cutters cutting both ends of the straw according to an embodiment.

FIG. 12B is a schematic representation showing cutting blades retracting, and both ends of the straw falling away according to an embodiment.

FIG. 12C is a schematic representation showing the straw holder, straw, and sample are translated to a position above the well containing the sample warming solution, and in line with the sample wand as it is held on a second translation stage according to an embodiment.

FIG. 13A is a schematic representation showing a sample wand translating until it contacts the sample holder according to an embodiment.

FIG. 13B is a schematic representation showing a sample wand rapidly translating the sample into warming liquid according to an embodiment.

FIG. 13C is a schematic representation of the detail showing the sample in warming liquid according to an embodiment.

FIG. 14A is a schematic representation showing the sample wand retracted from the straw according to an embodiment.

FIG. 14B is a schematic representation showing the straw holder translation stage moving the straw holder back to load position according to an embodiment.

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Embodiments of the present invention are based on the inventor's extensive experience and expertise in designing and constructing cryocooling systems for cryocrystallography. Those systems include automated sample plunges into liquid nitrogen, cold gas removal, and automated placement of samples after cooling in multiple sample carousels or "pucks" for subsequent storage and use. Those systems can be used for "open system" cooling of ART samples with minor modifications—essentially, modifying the sample translation stage to accept an ART sample holder, and modifying the sample carousels to accept those samples. Embodiments of the present invention focus on the special challenges imposed by closed systems. In a closed system, all chance of cross-contamination of samples must preferably/ideally be eliminated. This is achieved in current commercial systems by cooling a dry straw with its top end open by immersing its lower portion in liquid nitrogen, inserting the sample and holder into the dry, cold straw, and then sealing the straw. On warming, the straw is opened, the sample holder and sample removed and each sample placed in a separate well with a separate warming solution.

Embodiments of the present invention take a different approach to a closed system. The samples are each cooled in liquid nitrogen contained in a separate disposable cup. After cooling they are enclosed in a straw or capillary tube for storage. The liquid nitrogen in the cup and the cup are used for cooling of one and only one sample, eliminating the possibility of cross-contamination.

Figures 1A, 1B:
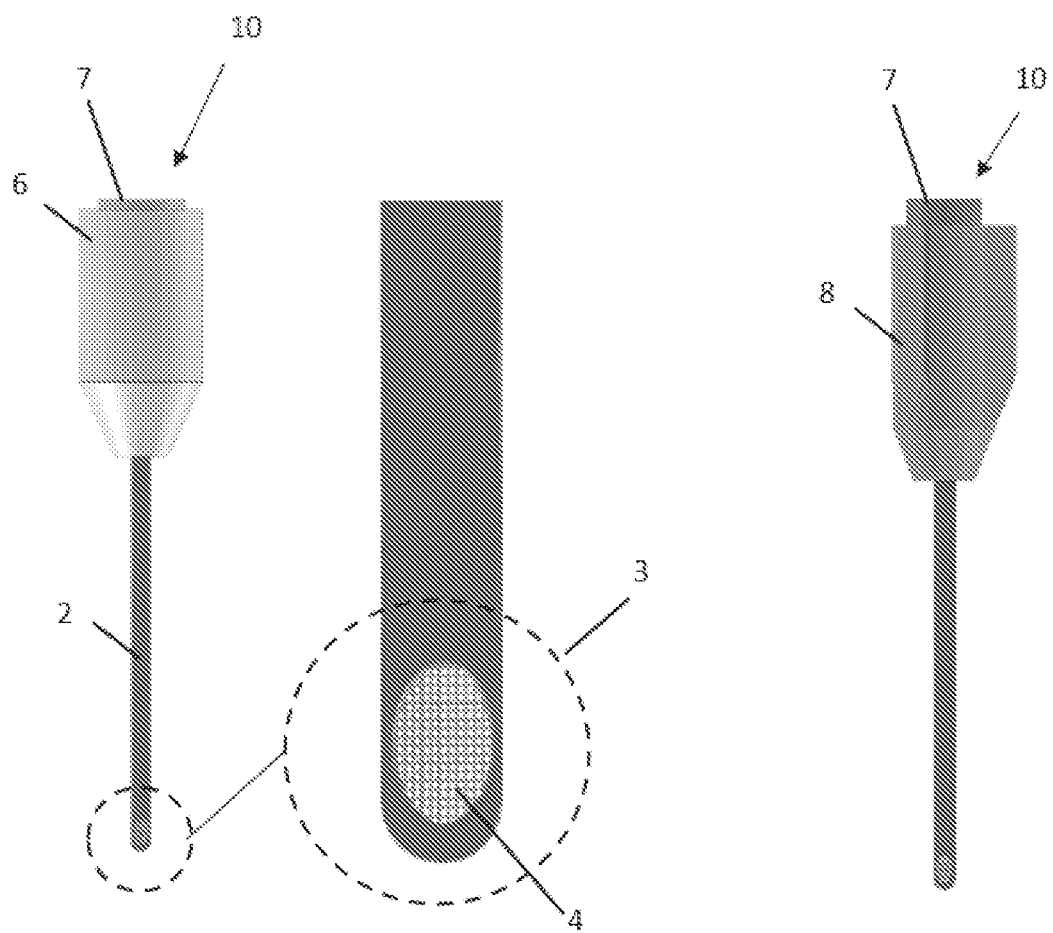
FIG. 1A is a schematic representation of a sample holder according to an embodiment.
FIG. 1B is a schematic representation of a sample holder according to an alternative embodiment.

FIG. 1A-B show examples of holders 10 that accept the sample to be cooled—eggs, embryos, etc. The holder 10 consists of a thin but rigid rod 2 with a sample-accepting region 3 near its distal end, that is attached to a cylinder 6 with a diameter somewhat smaller than the diameter of the capillary or straw (see FIG. 2A). The rod 2 may be flat, and may be of injection molded plastic. The sample may be supported on a thin window or mesh that is injection molded with the rest of the rod 2. However, the fastest cooling and warming can be achieved if the supporting surface is as thin as possible and if its size is at least several times larger than the sample to be cooled, to minimize the thermal mass in contact with the sample, minimize heat conduction from the rest of the rod 2, and maximize access of liquid nitrogen to the sample. This can be achieved by bonding a separate thin micropatterned film 4 perhaps 5-25 microns in thickness to the rod, which then can span an aperture (e.g., oval, circular, square or other shaped) in the rod with dimensions of order 1-3 mm, 10 times the sample diameter. The film 4 may be patterned with two or more, e.g., 100 micron, holes so that multiple samples can be deposited, with a mesh, or other patterns. The thin film 4 could be bonded ultrasonically or using an adhesive. The rod 2 could also be cylindrical steel, and the sample could be held in a microfabricated tip attached to the steel pin, as in the design of MicroMounts and other microtools manufactured by Mitegen, LLC (as should be understood by a person of skill in the art in conjunction with a review of this disclosure). Compared with the design of MicroMounts, the advantage of the configuration shown in FIG. 1A is that the sample is protected by the thicker portion of the rod surrounding it should the holder be dropped and its end come into contact with a hard surface. The rod 2 can be preferably flat, not circular in cross-section.

The upper, cylindrical portion 6 of the holder may contain a cylindrical magnet or piece of magnetic steel 7, which can have a flat top. This allows the holder to be gripped using a magnetic wand. The upper portion can be of injection molded plastic, with the magnetic steel or magnet 7 press fit into the plastic. The shape of the upper portion's mating surface with the wand can be contoured to provide the most stable gripping of the holder (as should be understood by a person of ordinary skill in the art in conjunction with this disclosure).

FIG. 1A shows one possible design in which the cylindrical portion 6 of the holder 10 is designed to slide smoothly within the straw or tube, and so has a diameter that is somewhat smaller than the straw inside diameter. In this case, the sample holder is held in place within the straw using a magnet.

FIG. 1B shows an alternative embodiment in which the cylindrical portion 6 of the sample holder has fins 8 that gently push against the inside of the straw (see FIG. 2A). These fins 8 are such that the sample holder 10 can be easily pushed in and out of the straw, but are sufficient to securely hold the sample in a fixed position within the straw during storage and handling. The length of the cylindrical portion 6 and fins 8 can be adjusted to reduce the tendency of the sample holder's axis to deviate significantly from the axis of the straw.

Typical dimensions for the sample holder 10 are 2-10 cm for the length of the rod 2, 1-3 mm for the rod 2 width, and 2-5 mm for the diameter of the cylindrical head. The cylindrical head 6 may have bar codes or other markings or contain an RFID chip (not shown) to facilitate sample identification.

FIG. 2A shows the straw 12 used to enclose the sample holder 10. This straw 12 can be a hollow cylindrical polymer tube, with a diameter, for example, of 2-5 mm and larger than the diameter of the cylindrical head 6 of the sample holder 10, preferably with an angle cut 13 at one end. Preferably, the straw 12 can be made of a polymer like PET, which has good optical clarity, or COC, which has excellent optical clarity and is also UV transparent. Preferably, the thickness of the straw walls can be 25-50 micrometers and not more than 100 micrometers, so that the straw 12 can be optically clear and homogeneous. The goal is allow inspection of frozen samples within the straw using an optical microscope or using, e.g., UV-excited fluorescence imaging. Preferably, the straw 12 should at least be 1-2 cm longer than the sample holder 10, to provide space for straw 12 sealing. The straw 12 may also have markings or bar codes or have an RFID chip with antenna bonded to it (not shown) for sample identification.

FIG. 2B shows the cup 20 used to hold the liquid nitrogen that is used to cool each sample. The cup can be disposable, and can be made of paper, suitable plastics, aluminum foil, or any material or combination of materials that should not be porous to liquid nitrogen and should not crack or develop leaks when filled with liquid nitrogen. The cup can also be reusable, but should be sterilized between uses. Ideally the material should be thin, to minimize waste and maximize heat transfer to the cup Dewar well. For example, blow-molded PET could be satisfactory. The overall length of the cup should be at least a few centimeters longer than the straw. Otherwise, its length and volume should be kept as small as is feasible to minimize consumption of liquid nitrogen. At the bottom of the cup can be a small extension or nipple 22 or other feature to facilitate creating an opening in the cup to allow liquid nitrogen to drain out after a sample has been cooled. The material thickness in the nipple 22 should be small enough to facilitate easy cutting using a sharp blade or cutters.

FIGS. 3A-B show examples of the straw holder 30 that are used to hold the straws 12 during cooling and warming, and to transfer straw-containing samples through ambient air from one place to another. The straw holder 30 has hemi-cylindrical jaws 32 that grip the straw and cover a length of straw comparable to the length of the sample holder. These jaws 32 are of a material (e.g., stainless steel) and thickness such that their temperature responds very slowly when the straw holder is removed from liquid nitrogen into ambient air. The jaws 32 surround the sample, and keep the sample cold during transfers through air between the cooling device and a storage Dewar, and from the storage Dewar to the warming device. Preferably, these jaws 32 are separated using mechanism driven by an actuator 34 (e.g., thumb push-button) in the top of the straw holder 30, above the portion where a user's hand wraps around the straw holder. The straw holder may have rubber or other gripping material in this upper portion. The tong jaws 32 may also contain one or more magnets 36 that can be used to hold the sample holder 10 within the straw in a fixed position relative to the straw and the tong jaws 32. These magnets 36 can prevent the sample holder 10 of the design shown in FIG. 1A from dropping out the bottom end of the straw when the sample holder 10 is released from the wand that holds it during the cooling plunge. Magnets 36 in the tong jaws 32 are not necessary for the sample holder design of FIG. 1B.

Figure 4:
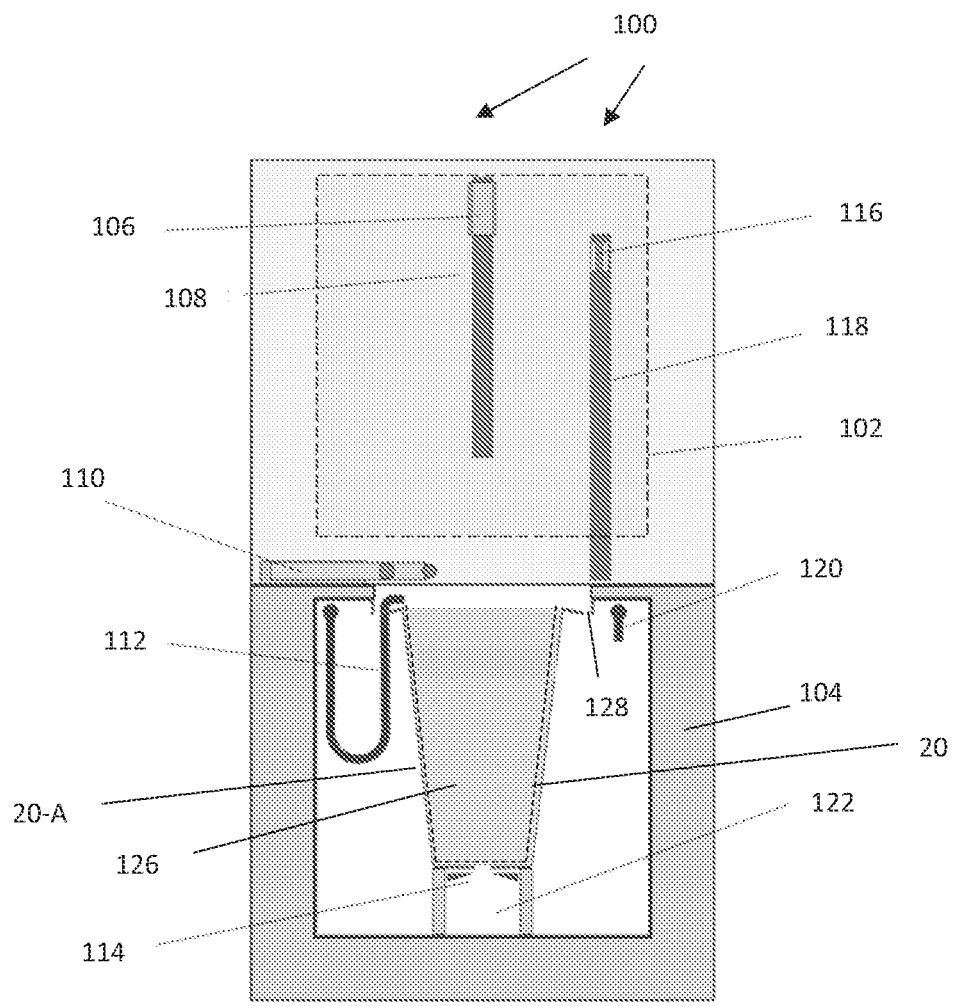
FIG. 4 is a sample cryocooling system a according to an embodiment.

FIG. 4 illustrates some aspects of a preferred cooling device 100. The device can contain, but is not limited to, four chambers for liquid nitrogen (as identified and described below). The upper portion contains the main liquid nitrogen storage chamber 102, which can be filled with liquid nitrogen by the user. It can be constructed from vacuum-insulated glass, vacuum insulated stainless steel, insulating polymer foam, or other materials and structures commonly used to contain cryogenic liquids. The volume of this chamber should be sufficient to allow cooling of at least 10-20 samples and an operation time before refilling is necessary of at least one hour. This likely can call for a volume of at least 2-4 liters.

Beneath this main storage chamber is the cup Dewar 104. This Dewar 104 holds liquid nitrogen that surrounds a structure that accepts the cup 20 in which the sample is cooled (or is otherwise in thermal contact with the cup holder 20-A, described below, and held by that contact at cryogenic temperature). The structure surrounding the cup—the cup holder 20-A—is preferably of thin copper or some other high thermal conductance material, so that the cup 20 is cooled effectively by contact with the structure's walls. This cup Dewar 104 is gravity-fed from the main storage chamber 102, and can have level sensors, a valve, and control electronics (not shown, but should be understood by a person of skill in the art in conjunction with a review of this disclosure, and can be similar to MiTeGen's Nanuq cryocooler) to maintain the fill level of the cup Dewar 104 at a desired level. The cup Dewar 104 can be vented to the atmosphere via a pressure release valve or flap (not shown).

FIG. 4 also shows a sample wand holder 106 (which holds a wand (202 in FIG. 6) to which a sample holder 10 is attached) attached to the sample vertical translation stage 108 (details of stage not shown), ultrasonic sealer 110, cup $LN_2$ feed 112, cup cutters 114, straw holder mount 116 attached to the straw vertical translation stage 118, cup Dewar $LN_2$ feed 120, and drain 122 for used cup $LN_2$.

The cup 20 of FIG. 2B (shown by dotted lines in FIG. 4), inserted into the cup holder 20-A, forms the third liquid nitrogen chamber 126. It is manually inserted into the cup holder 20-A in the cup Dewar 104. It is filled from the main storage chamber 102 by gravity feed (via a sterile gravity-feed $LN_2$ line 112). Level sensors and a valve (not shown) can be used to keep the cup holder full to its brim at all times during operation (as should be understood by a person of skill in the art in conjunction with a review of this disclosure). Alternatively, the cup can be filled once by opening a valve (not shown) for a fixed time. The structure of the cup Dewar 104 can include one or more drains 128 in its top surface, through which liquid nitrogen overflow from the cup flows into the cup Dewar 104.

Beneath the cup holder 20-A is a fourth liquid nitrogen chamber—the cup drain 122. Liquid nitrogen can be drained from the cup 20 into this chamber 122, and heaters and/or suction (not shown) can be used to boil away this used liquid nitrogen and vent it to the atmosphere.

Aside from these liquid nitrogen chambers, the cooling device has two motor-driven linear translation stages 108 and 118, the first 108 translates the sample holder 10 (FIG. 1) and sample holder wand 202 (FIG. 6) and the second 118 that holds the straw holder 30 (FIG. 3) that grips the straw 12 (FIG. 2). It also has an ultrasonic or thermal sealer 110 with retractable jaws for sealing the ends of the straws.

Figure 5A:
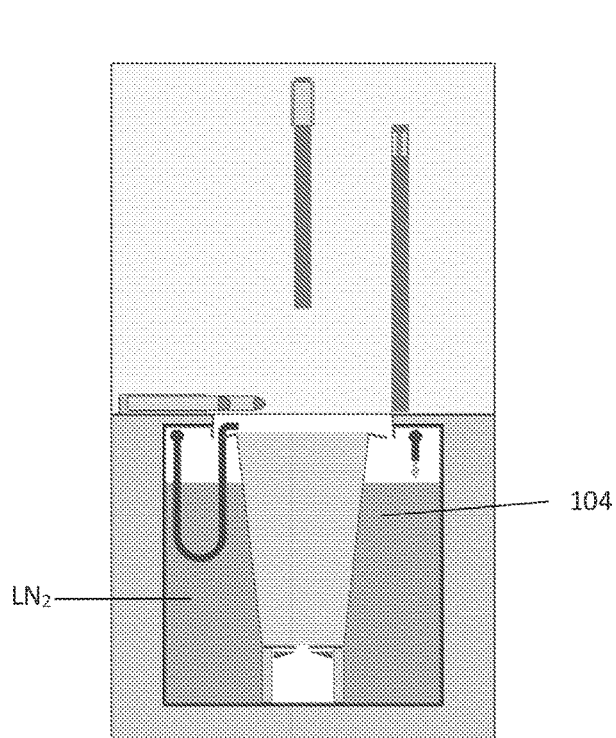
FIGS. 5A-D are schematic representations of a sequence of steps in cryocooling a sample according to an embodiment.
Figure 5B:
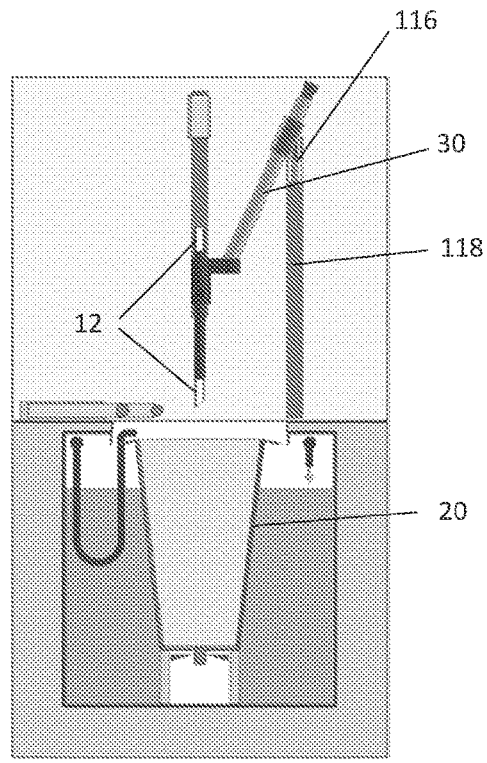
Figure 5C:
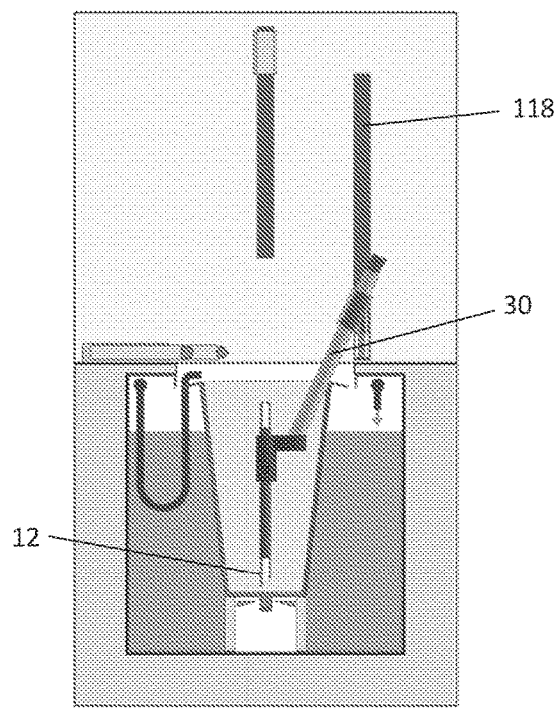
Figure 5D:
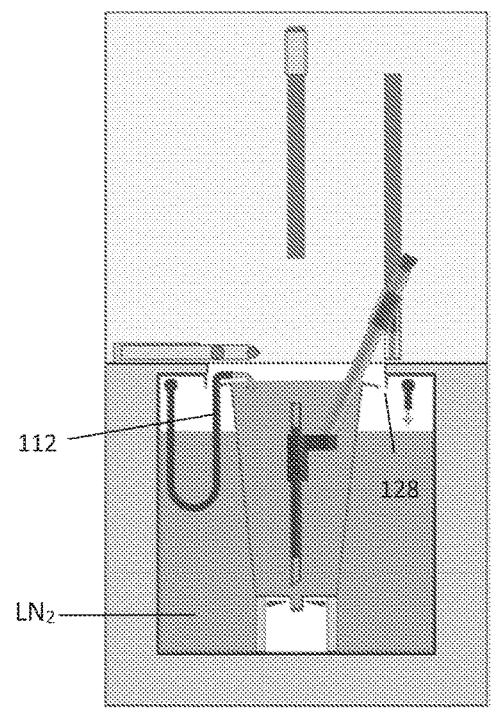

FIGS. 5A-D show initial steps in using the cooling device 100 for sample cooling. First, the cup Dewar 104 is filled with liquid nitrogen $LN_2$ (FIG. 5A). The cup 20 is placed in the cup holder 20-A, and the straw holder 30 holding the straw 12 are placed on straw vertical translation stage 118 (FIG. 5B). The straw holder 30 attaches to the stage 118 using a mount 116 that can provide accurate and reproducible positioning, so the axis of the straw 12 can preferably be substantially vertical and aligned with the axis of the sample holder (not shown; see FIG. 6) during a plunge. The straw holder 30 and straw 12 are translated into the cup 20 (FIG. 5C), and then the cup 20 is filled with liquid nitrogen via cup LN$_2$ feed 112 until it overflows, with the overflow draining via the drain 128 into the cup Dewar 104.

If needed, the liquid nitrogen in the cup can be sterilized by passing the liquid nitrogen from the upper tank through a filter (e.g., 0.22 micrometer filter) (not shown) on its way to the cup, or by using UV radiation produced by, e.g., a solid state LED (not shown)

Figure 6A:
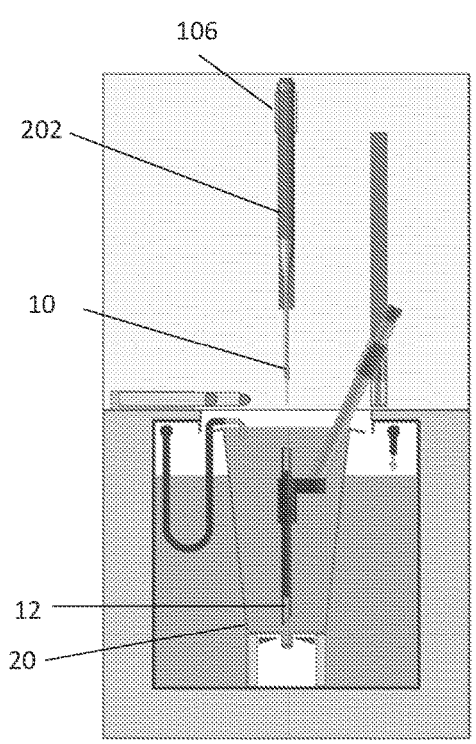
FIGS. 6A-D are schematic representations of a sequence of steps in cryocooling a sample (continued) according to an embodiment.

FIGS. 6A-D show the next steps in using the device for sample cooling. The sample holder 10 is attached magnetically to the sample wand 202, and the wand is attached to the sample wand holder 106 on the sample wand's vertical translation stage (FIG. 6A). The sample may have already been deposited on the sample holder 10 prior to attachment of the sample holder 10 to the wand 202 and the cooling device 100. The sample may also be deposited in situ, while the sample holder 10 is held in the cooling device 100. In this case, provision may be made for a rest or aperture or other support (not shown) that supports the pipette tip that may be used to transfer the sample, helps align it with the sample holder aperture, and reduces tip motion to facilitate sample deposition. Provision may also be made for a video microscope or a boom-mounted microscope or similar device (not shown) for viewing the sample holder and pipette tip during sample deposition.

Figure 6B:
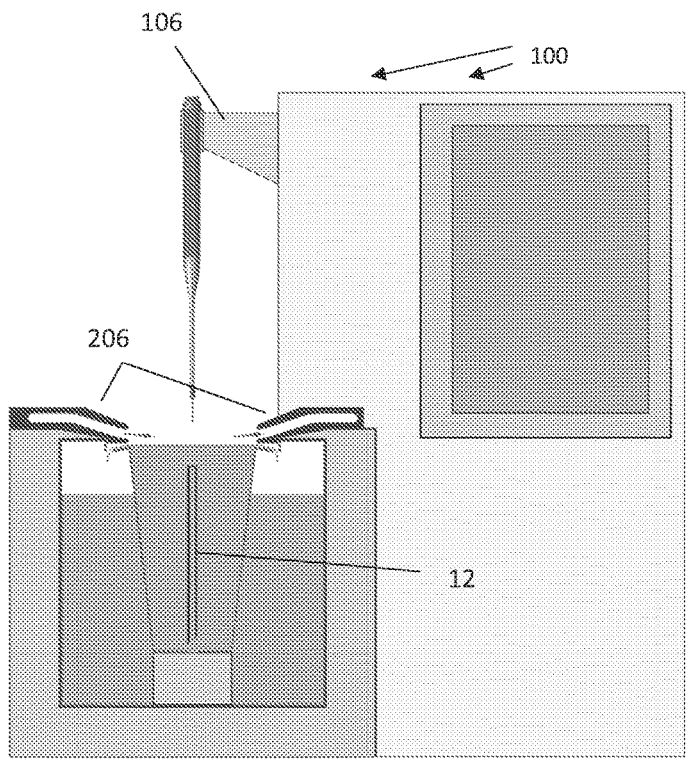

FIG. 6B shows the gas handling manifold 206 that is used to remove the cold gas layer above the liquid nitrogen in the cup 20 prior to sample plunging. As in the Nanuq cryocooling device manufactured by Mitegen, LLC, dry nitrogen gas at room temperature is fed in from one side of the cup Dewar by the manifold 206, and washes across the liquid nitrogen surface in the cup 20, before being sucked away through an aperture in the manifold 206 on the opposite side of the cup. The dry nitrogen gas can come from a house nitrogen supply, from a compressed gas cylinder, or from heated boil-off from the upper liquid nitrogen chamber. The suction can be provided by a small blower or pump (not shown).

Figure 6C:
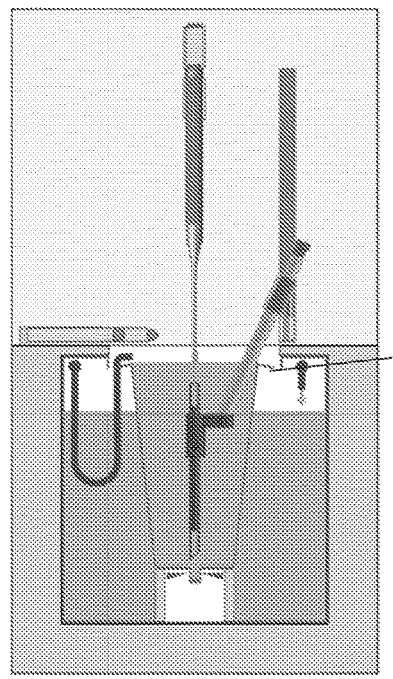
Figure 6D:
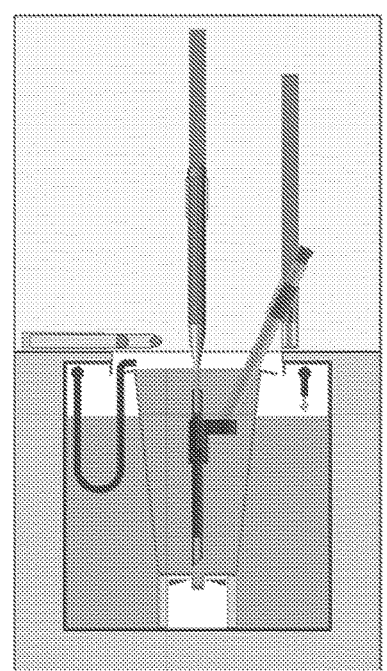

Immediately prior to the sample plunge into liquid nitrogen, the cold gas layer above the liquid nitrogen is removed by the gas handling manifold 206 (FIG. 6B). The sample is plunged at high speed (1-3 m/s) into the liquid nitrogen, momentarily stopping before the large diameter portion of the sample holder 10 enters the straw 12 (FIG. 6C). The sample holder 10 is next translated fully into the straw (FIG. 6D) and the sample holder is released from the sample wand 202, remaining held in place relative to the straw either by magnets (36 in FIG. 3) in the straw holder 30 or by fins (8 in FIG. 1) on the side of the sample holder. The sample holder wand 202 is then retracted and the wand removed.

Figure 7A:
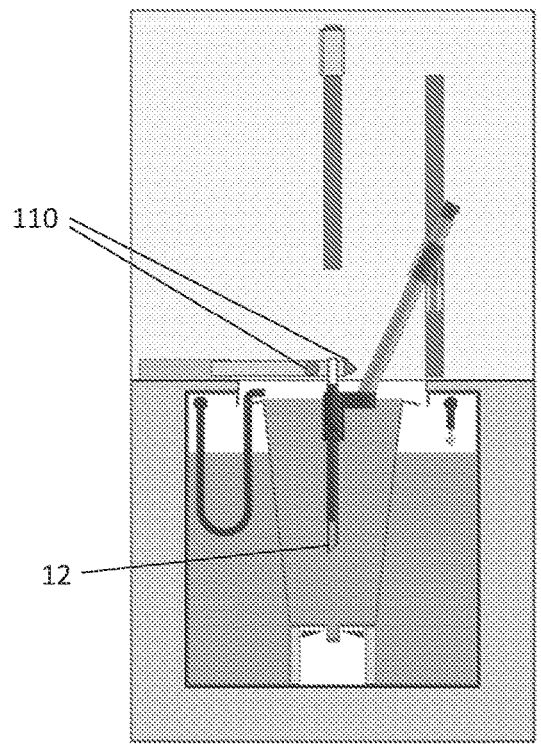
FIGS. 7A-C are schematic representations of a sequence of steps in cryocooling a sample (continued) according to an embodiment.
Figure 7B:
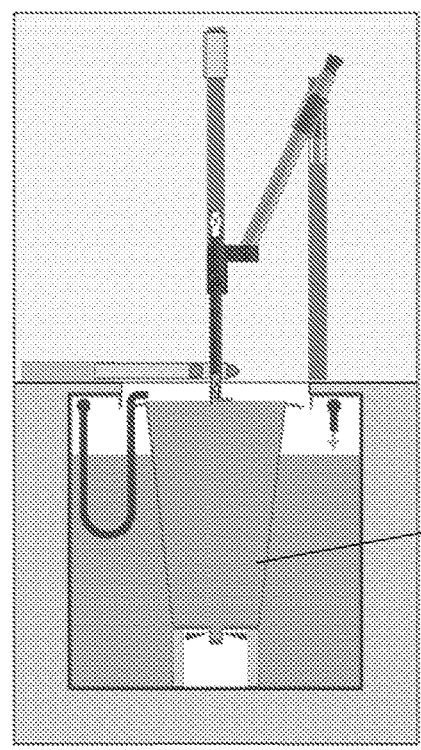
Figure 7C:
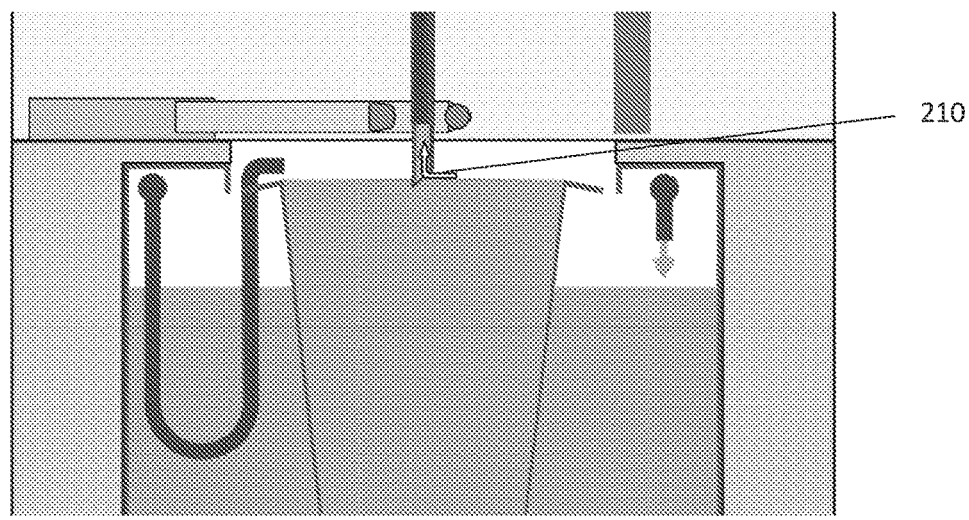

Next, the sample is sealed inside the straw. The jaws of the ultrasonic sealer 110, which are initially retracted to allow insertion of the cup 20, move into position, and the straw 12 is translated so that its upper end is within the jaws of the sealer (FIG. 7A). The upper end of the straw 12 is sealed, and then the straw is translated upward until its lower end begins to break the surface of the liquid nitrogen in the cup (FIG. 7B). Draining of the liquid nitrogen out of the bottom of the straw could draw warm gas into the straw and thaw the sample. To prevent this, the bottom of the straw has an angled cut (13 in FIG. 2), and the straw is slowly translated upward as the liquid nitrogen level traverses this cut, so that as liquid nitrogen flows out of the straw cold gas 210 from the surface of the liquid nitrogen flows in (FIG. 7C).

Figure 8A:
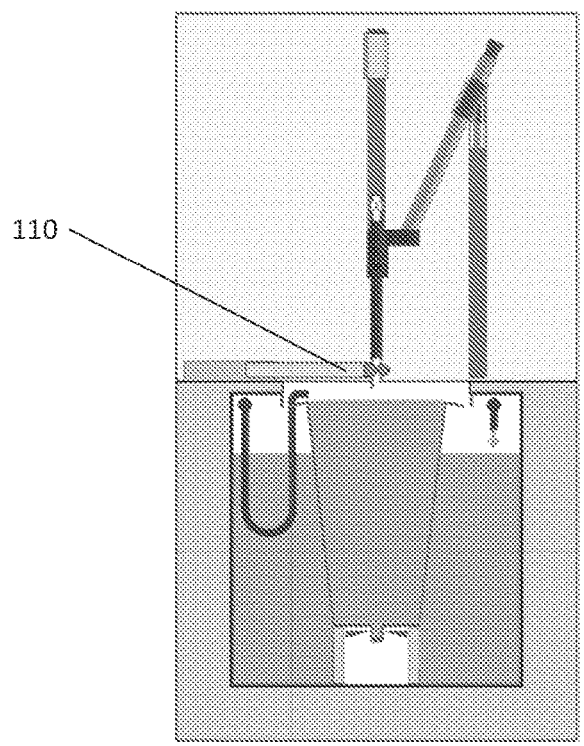
FIGS. 8A-C are schematic representations of a sequence of steps in cryocooling a sample (continued) according to an embodiment.
Figure 8B:
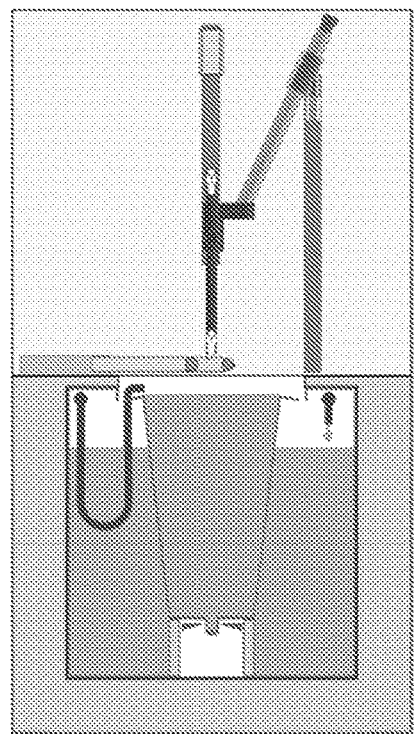
Figure 8C:
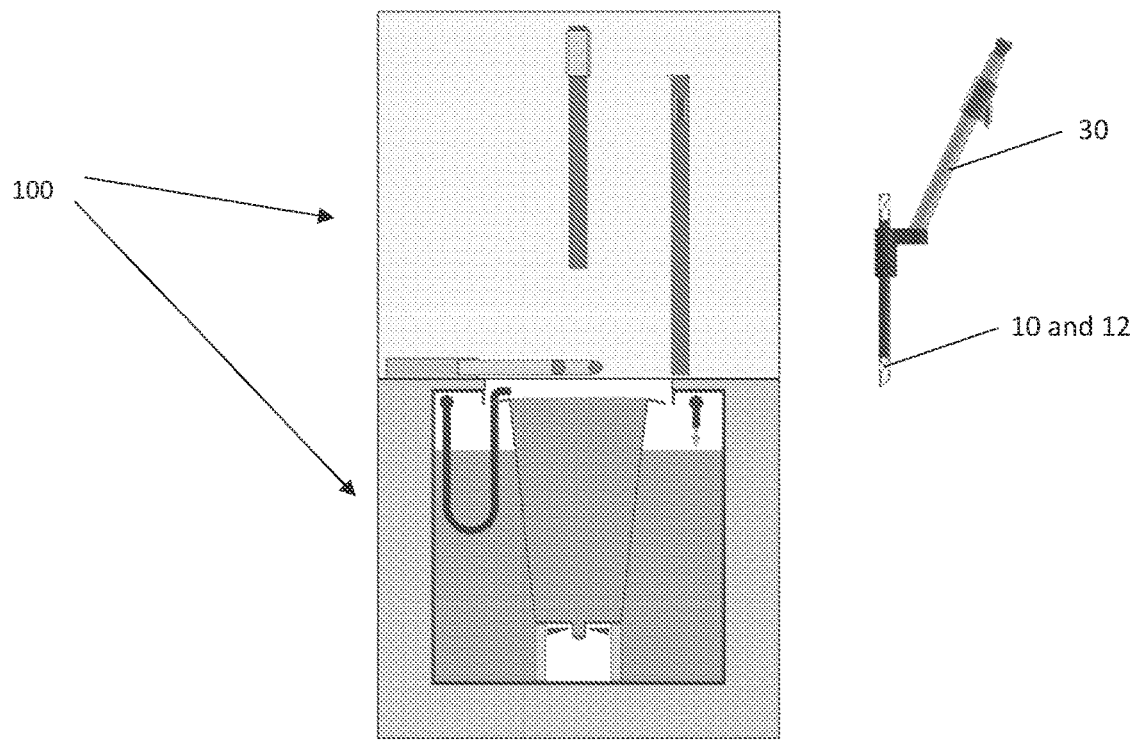

The sample and straw are then translated upward so that the bottom of the straw is within the sealer jaws, and the bottom of the straw sealed when all liquid nitrogen has dripped out of the straw. (FIG. 8A). The straw is then translated up past the sealer jaws (FIG. 8B), the jaws retract, the straw holder 30, straw 12, and sample 10 (inside the straw) are removed from the cooling unit 100 (FIG. 8C), and the straw+sample released from the straw holder into a liquid-nitrogen-containing storage cup, vial or cane (not shown).

Figures 9A, 9B:
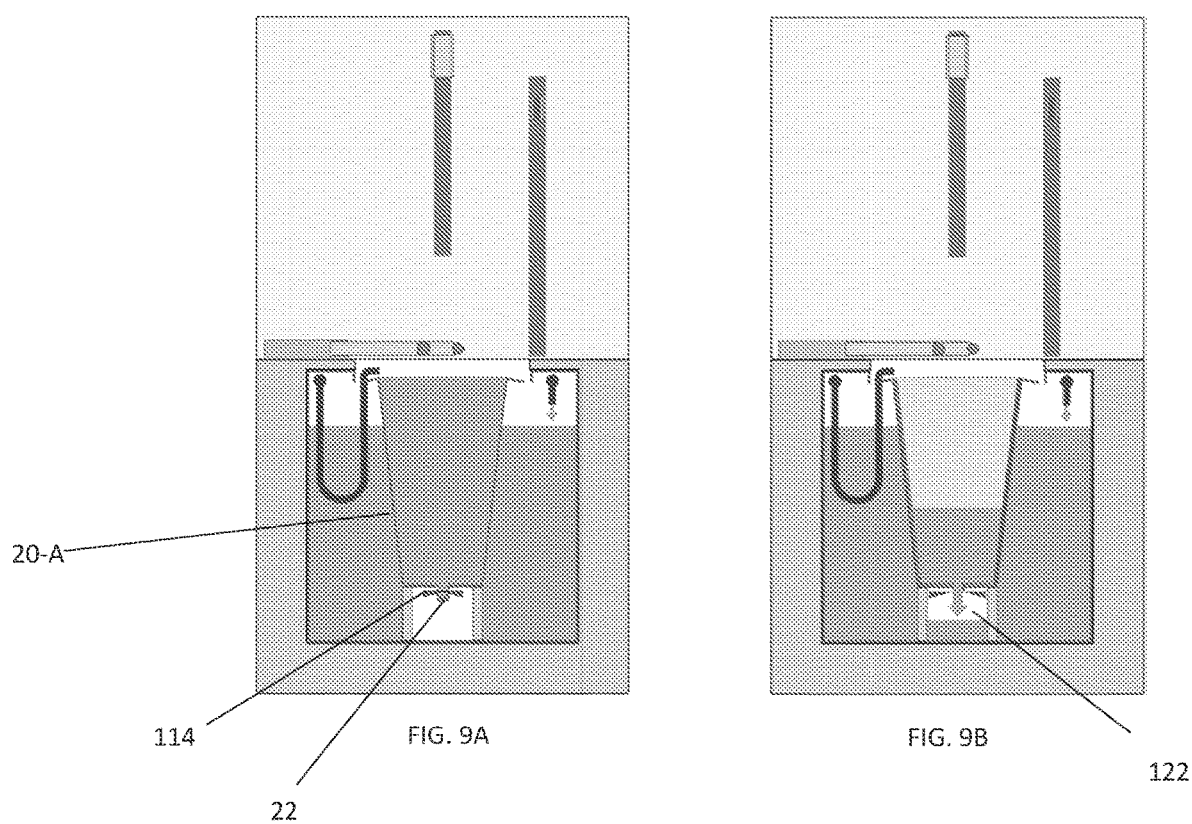
FIGS. 9A-B are schematic representations of a sequence of steps in cryocooling a sample (continued) according to an embodiment.

Finally, cutting jaws or blades of the cup cutter 114 on the bottom of the cup holder 20-A sever the nipple 22 on the cup (FIG. 9A), and liquid nitrogen flows out of the bottom of the cup into the cup drain 122, possibly assisted by suction generated by a pump or fan (not shown) that prevents backpressure from boiling nitrogen from pushing the cup upward. A heater in the cup drain (not shown) can boil off the liquid nitrogen. The cup drain vents to ambient through a flap or valve that prevents moist air from entering it.

Not shown in the figures is a thermally insulated and heated cover that covers the cup Dewar and prevents warm, moist air from coming in contact with the cold gas or liquid and forming ice. The cover has an opening for the cup. Liquid nitrogen boil off gas and dry nitrogen gas fed in via the gas manifold (206 in FIG. 5) maintain a slight positive pressure in the space between the cup Dewar and the cover, so that warm moist air is largely prevented from entering into the space below the cover.

To facilitate straw and sample storage after cooling, the straw holder (30 in FIG. 3) may be attached to the straw holder translation stage (118 in FIG. 4) using a mechanism (not shown) that allows it to flip in a horizontal plane between an "in" and "out" position, where the "out" position aligns the straw with a separate storage container of liquid nitrogen that may, e.g., rest in a depression on the lower part of the cooling device or on a table adjacent to it. The sample and straw can then be translated using the translation stage into a separate liquid nitrogen storage container (not shown), and the straw released from the straw holder, and the holder removed or translated back to its initial position. After several sample-containing straws have been deposited in this way in the storage container, the storage container can be placed in a standard wide-mouth storage Dewar or cryogenic dry shipper.

In accordance with an alternative embodiment, straw holder 30 can be inserted into cup 20, then the straw 12 in the holder 30, after which LN2 can be added, the sample in the sample holder 10 can be moved into the LN2 and into the straw 12, and then the straw 12 can be pulled up manually by hand to seal the top and bottom. Then, the straw holder 30 can be removed, followed by removal of the cup 30. So this would be as previously described, except that the straw 12 may not be as protected by the jaws 32 of the straw holder 30 during transfer, and the straw 12 would not be automatically transferred. The straw holder 30 could flip up and down.

Figure 10:
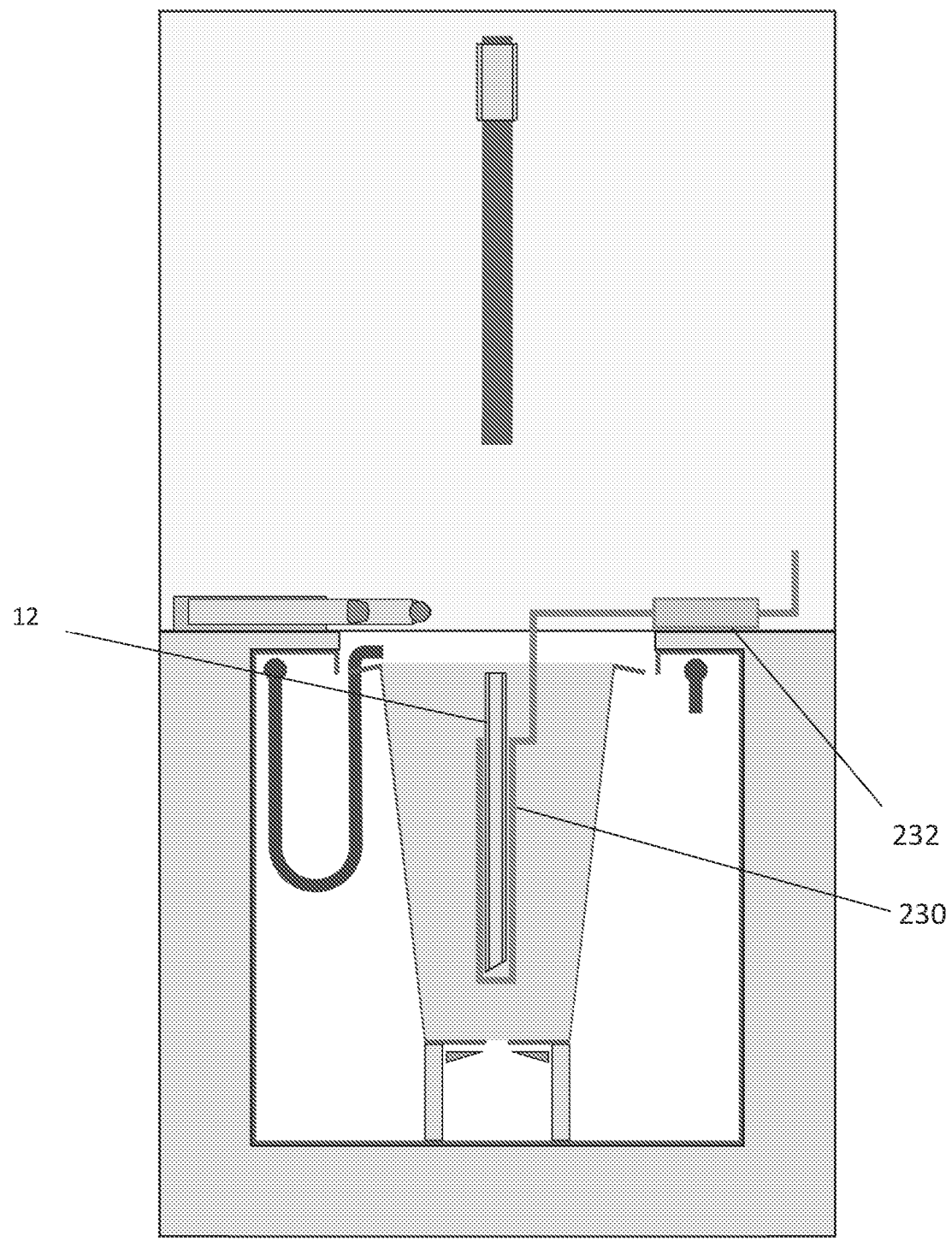
FIG. 10 is a schematic representation showing an alternative embodiment of the cooling device in which the straw is held in a straw holder, and where the straw holder is manually inserted into and removed from the cup.

FIG. 10 shows an alternative embodiment of the cooling device in which the motions of the straw and straw holder are all performed manually, without use of a straw holder translation stage. In this case, a straw holder 230 is inserted into the cup, while being held in place via a mount 232 that ensures that the axis of the straw will be collinear with the axis of the sample mount and sample wand (as should be understood by a person of ordinary skill in the art in conjunction with a review of this disclosure). A straw is inserted into the straw holder, and then the cup is filled with liquid nitrogen. The sample is then plunged into the straw (e.g., as previously described). Then the straw and straw holder are lifted up so that the straw can be sealed below its top end. Then the straw is grabbed by hand and translated up to seal the bottom of the straw.

Fast, automated sample motions, removal of cold gas, and other design features as described above allow extremely rapid and reproducible cooling of the roughly 100 micrometer samples of interest in assisted reproduction and eliminate opportunities for operator error where the samples may be inadvertently thawed.

FIGS. 11-14 illustrate one implementation of an automated warming device, and how the samples described here may be warmed using it. Samples 10 in sealed straws 12 are stored in a liquid nitrogen Dewar 300 (FIG. 11A), and are typically warmed in a small volume of solution 302 contained one well of a multiple well microplate 304 (FIG. 11C). The straw holder jaws 32 (FIG. 10B) are first cooled by immersion in liquid nitrogen, and then are used to grip the sample+straw of interest, and remove it from the storage Dewar (FIG. 11B). The straw holder and sample are then quickly inserted into the straw holder translation stage 310 of the warming device (FIG. 11C), with the jaws 32 of the straw holder keeping the sample cold. An extraction wand 312—which can be the same as the wand 202 (FIG. 6) used with the cooling device—is attached using a clip 314 to a second translation stage 316.

Figure 12A:
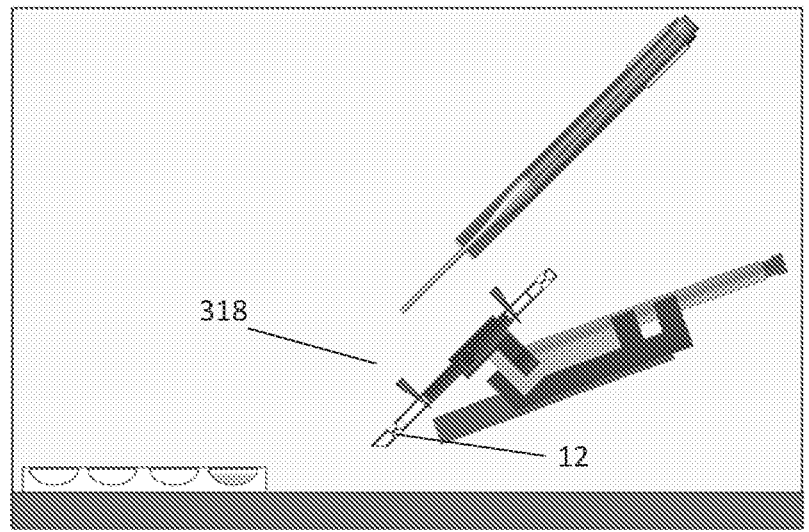
FIGS. 12A-C are schematic representations of a sequence of steps in warming a sample according to an embodiment.
Figure 12B:
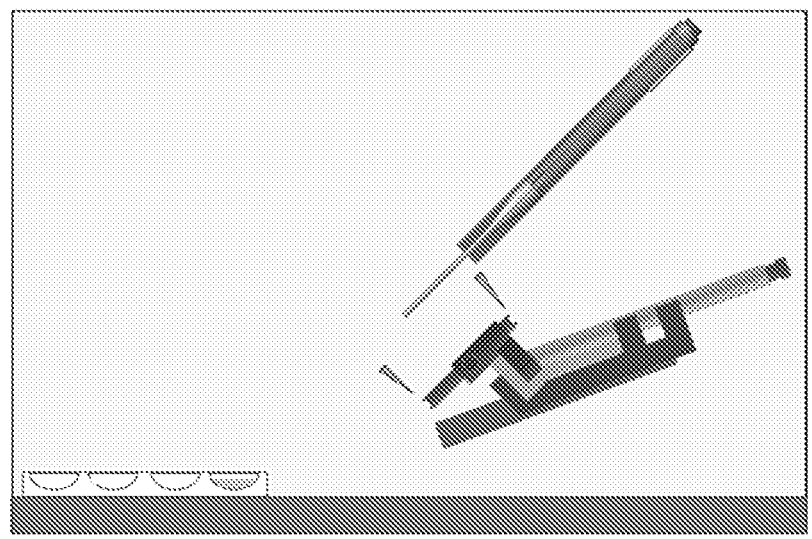
Figure 12C:
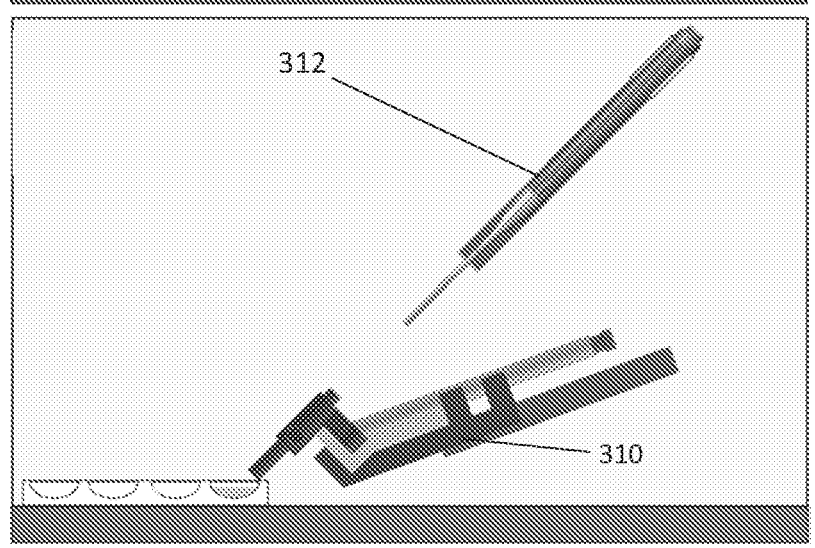

Cutting jaws or blades 318 simultaneously cut and remove both ends of the straw 12 (FIG. 12A,B), and the straw translation stage 310 moves the straw into position above the warming solution, and with its axis aligned with the axis of the extraction wand 312 (FIG. 12C).

Figure 13A:
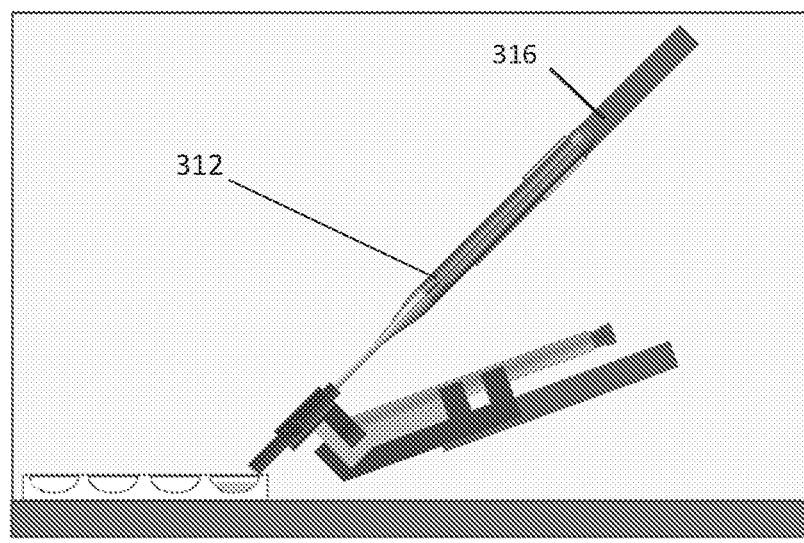
FIGS. 13A-C are schematic representations showing a sequence of steps in warming a sample (continued) according to an embodiment.
Figure 13B:
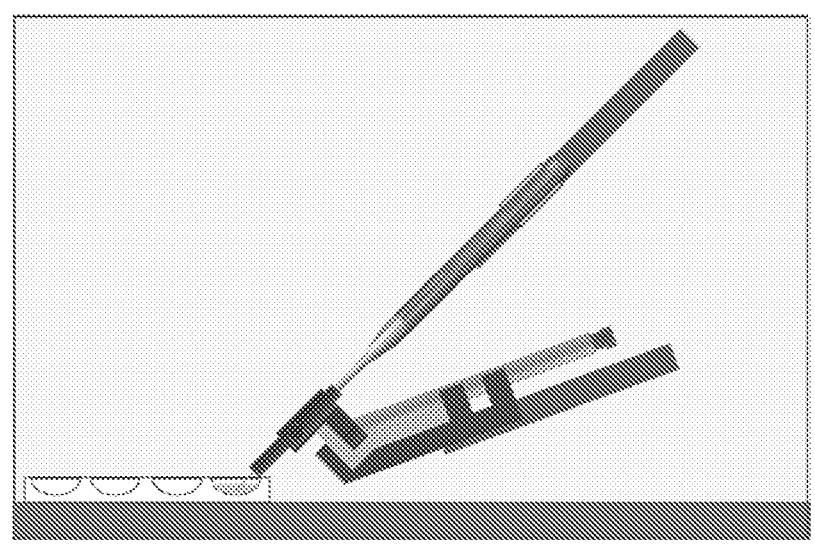
Figure 13C:
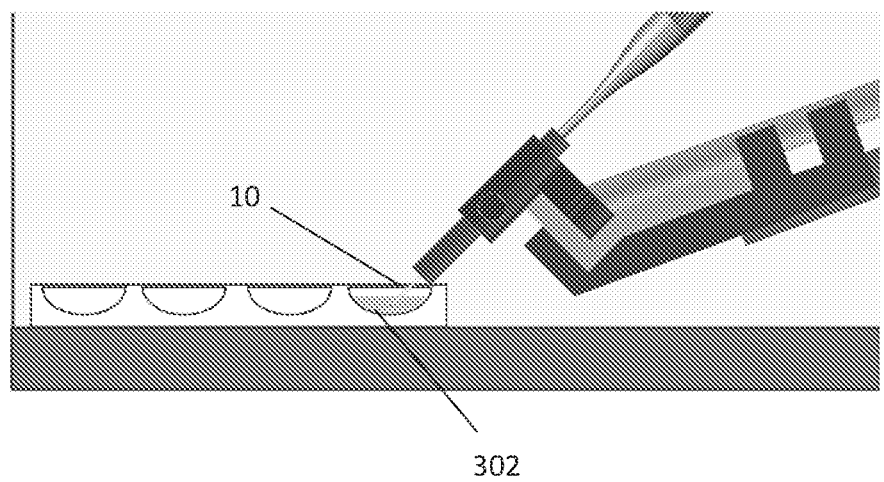

The extraction wand stage 316 then translates the extraction wand 312 into contact with the sample holder within the straw (FIG. 13A), and then rapidly pushes the sample holder through the straw so that the sample-holding tip of the sample holder 10 is rapidly plunged into the warming solution 302 (FIG. 13B,C).

Figure 14A:
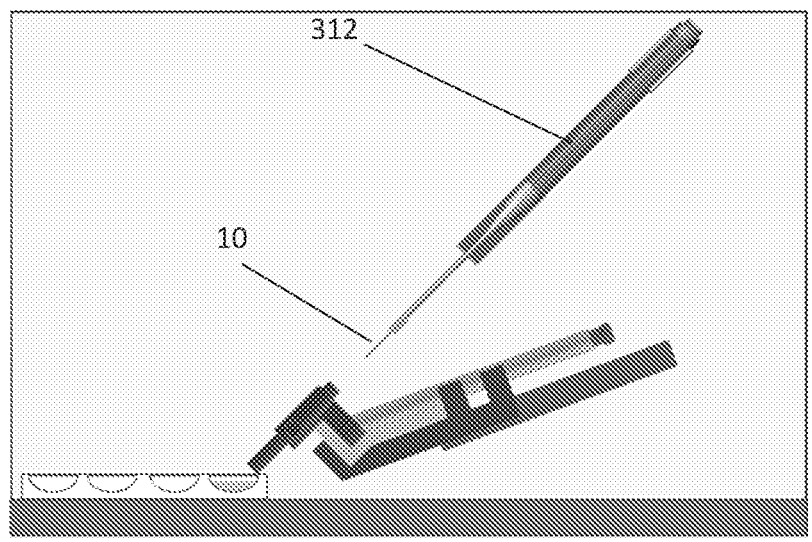
FIG. 14A-B are schematic representations showing the sequence of steps in warming a sample (continued) according to an embodiment.
Figure 14B:
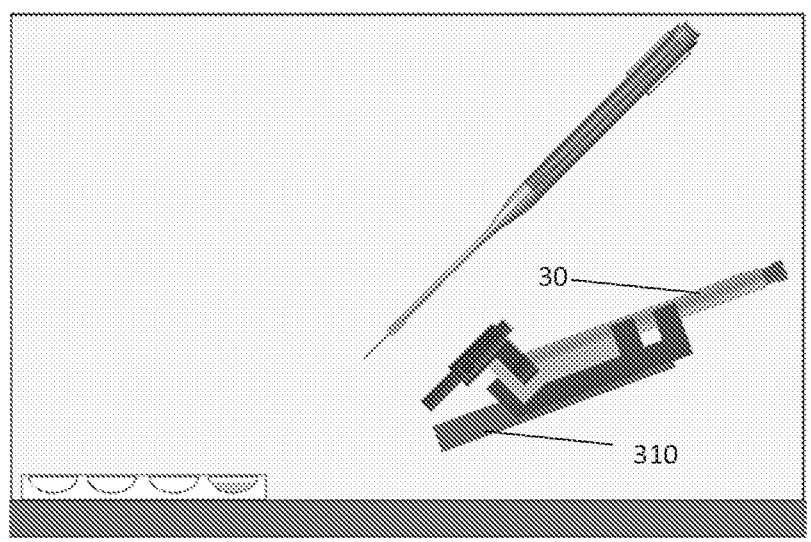

Once the sample has thawed and falls of the sample holder, the holder 10 and extraction wand 312 retract to their initial positions (FIG. 14A), and the straw and straw holder 30 retract to their initial positions (FIG. 14B). The sample holder and straw can then be released and disposed of.

As with cooling, fast, automated sample motions and the use of large thermal mass straw holding jaws to keep the sample from inadvertently warming up during handling ensure that the sample does not warm appreciably before it is plunged into the warm solution, that frost does not condense on the cold sample surface from the ambient air, and that warming rates are as large as possible.

Figure 15:
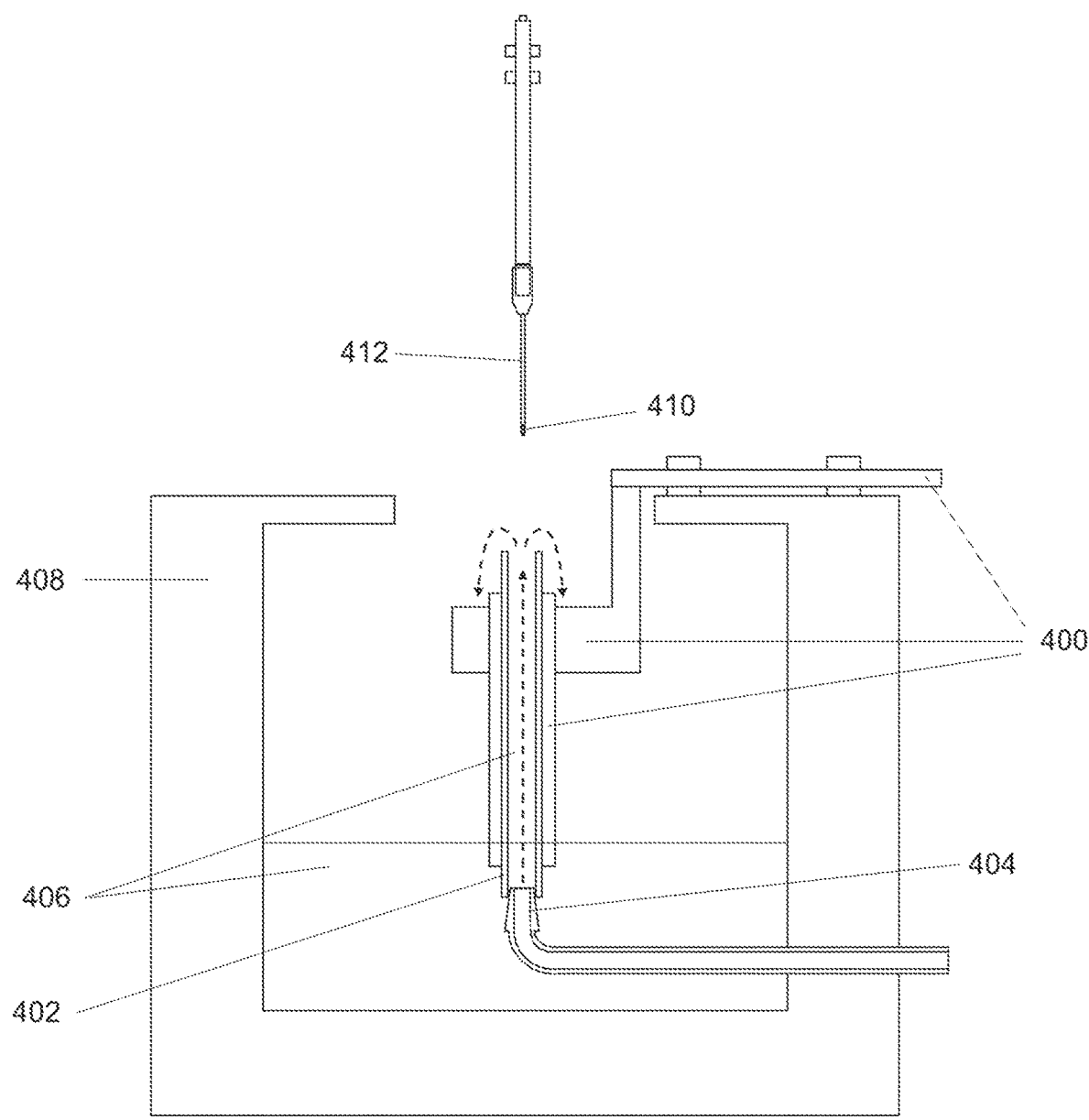
FIG. 15 is a schematic representation showing an alternative cooling device design according to an embodiment. The sample capillary is placed on a nipple from which liquid nitrogen flows.
Figure 16:
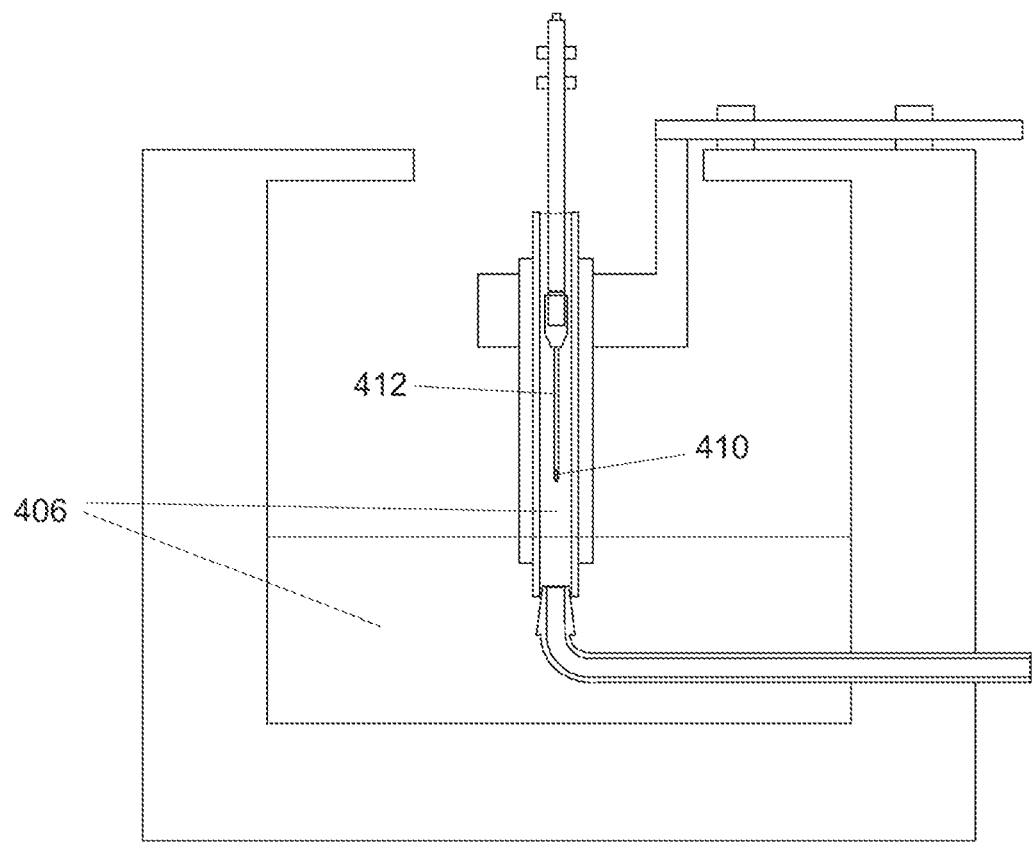
FIG. 16 is a schematic representation showing an alternative cooling device design as in FIG. 1 according to an embodiment. Liquid nitrogen flows through the tube, and the sample is cooled by directly plunging it in the tube.
Figure 17:
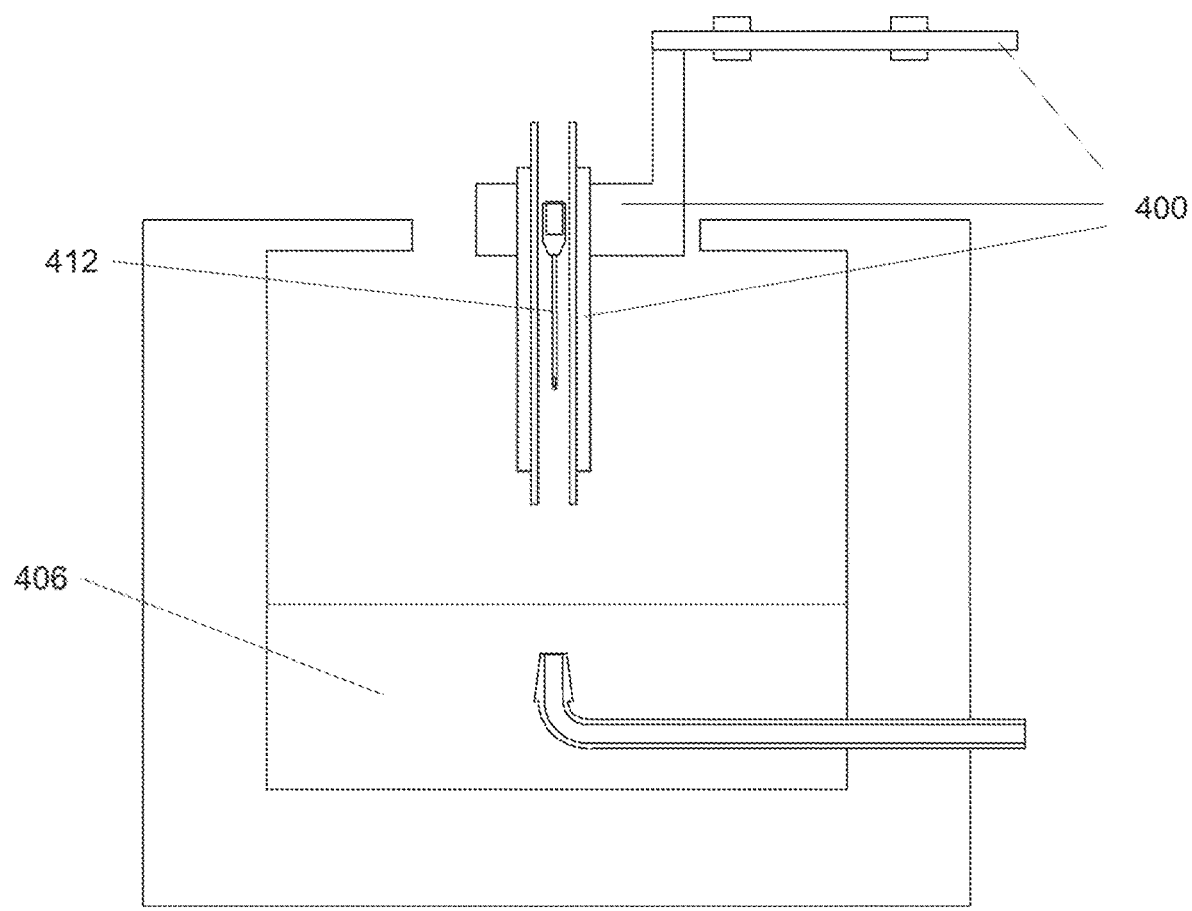
FIG. 17 is a schematic representation showing an alternative cooling device of FIGS. 15 and 16 according to an embodiment. After sample cooling, the straw and sample holder are lifted off the nipple, liquid nitrogen flows out of the tube, and cold gas from above the liquid nitrogen flows into the tube.

FIG. 15 shows an alternative cooling system design. In this case, a straw holder 400 is used to place the straw 402 onto a nipple or tube 404 that is connected via a valve (not shown) to an upper storage liquid nitrogen tank (as in 102 of FIG. 4). Liquid nitrogen 406 is then flowed through the tube, from bottom to top, flowing out the top and down the jaws of the straw holder 400 and into a lower liquid nitrogen Dewar 408. Once the straw 402 and holder 400 are cold, the sample 410 on the sample holder 412 is plunged into the straw (FIG. 16) as described in the previous embodiment. The sample holder is then released from the sample wand (not shown), the sample wand is retracted, and the straw is lifted up (FIG. 17) and sealed as described in the previous embodiment. In this case the liquid nitrogen flows out the bottom end of the straw as soon as it lifts off the fill nozzle 406 (FIG. 17), and cold gas above the liquid nitrogen in the lower chamber flows into the straw, keeping the sample cold.

The cooling and warming systems as described here will largely eliminate the risk of operator error causing sample damage, and reduce the skill level required for operators.

All definitions, as defined and used herein, should be understood to control over dictionary definitions, definitions in documents incorporated by reference, and/or ordinary meanings of the defined terms.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present

What is claimed is:

1. A system for cryocooling biological samples, the system comprising:
a first chamber having an upper portion and a lower portion, the lower portion holding and directly contacting a first amount of a cryogenic liquid;
a container holder positioned within the first chamber and in direct contact with the cryogenic liquid within the lower portion of the first chamber;
a removable container inside the first chamber and positioned within and removable from the container holder, the removable container having an exterior surface in direct contact with an interior surface of the container holder, wherein the removable container forms a second chamber holding a second amount of the cryogenic liquid, wherein the cryogenic liquid in the removable container is not in fluid contact with the cryogenic liquid in the first chamber;
an elongated tube holder that holds a hollow elongated tube into the removable container;
a sample holder with a first end opposite a second end supporting a biological sample;
a sample wand that holds and transfers the sample holder with the biological sample into the hollow elongated tube while the hollow elongated tube is in the removable container with the second amount of the cryogenic liquid; and
a translation stage attached to the sample wand and operable to vertically translate the sample holder from an initial position, located above the first chamber, to a final position, located within the removable container with the second amount of the cryogenic liquid such that the sample is fully immersed in the cryogenic liquid.

2. The system of claim 1, wherein the sample holder is an elongated sample holder having a distal end with a first diameter and a proximal end with a second diameter larger than the first diameter of the distal end.

3. The system of claim 2, wherein the proximal end of the elongated sample holder includes a magnet or a magnetic portion positioned thereon and configured to be magnetically held by the sample wand.

4. The system of claim 2, wherein the distal end of the elongated sample holder includes a micropatterned film positioned thereon, wherein the micropatterned film is configured to hold the biological sample.

5. The system of claim 4, wherein the micropatterned film is about 5-25 microns thick and has a width, length, and/or diameter of about 1-3 mm.

6. The system of claim 2, wherein the proximal end of the elongated sample holder includes a plurality of fins extending radially out from an outer surface of the proximal end, wherein the fins are configured to contact an inner surface of the hollow elongated tube when the elongated sample holder is positioned therein.

7. The system of claim 1, wherein a distal end of the hollow elongated tube includes an angled distal surface.

8. The system of claim 1, wherein the cryogenic liquid is liquid nitrogen.

9. The system of claim 1, wherein the container holder is rigidly mounted within the first chamber at least partially submerged in the first amount of the cryogenic liquid.

10. The system of claim 1, wherein the elongated tube holder includes elongated hemi-cylindrical jaws configured to grip the hollow elongated tube and extend a length comparable to substantially the length of the sample holder positioned therein.

11. The system of claim 10, wherein the elongated hemi-cylindrical jaws are composed of stainless steel.

12. The system of claim 1, further comprising a third chamber positioned above the first chamber, wherein the third chamber is configured to contain the cryogenic liquid and to deliver the cryogenic liquid to the first chamber and to the removable container via at least one conduit.

13. The system of claim 12, further comprising a fourth chamber formed by a bottom side wall portion of the container holder and an inner bottom surface of the first chamber, wherein the fourth chamber is configured to receive the second amount of the cryogenic liquid drained from the removable container.

14. The system of claim 13, wherein the fourth chamber further comprises a cutter configured to cut the removable container or pierce a bottom surface of the removable container to allow the second amount of the cryogenic liquid to drain from the removable container into the fourth chamber.

15. The system of claim 1, wherein the elongated tube holder is configured to be vertically transferred along a first vertical plane via a first vertical transfer mechanism.

16. The system of claim 15, wherein the translation stage is configured to vertically transfer the sample wand along the first vertical plane.

17. The system of claim 1, further comprising a gas handling manifold configured to remove a cold gas layer above the cryogenic liquid in the removable container.

18. The system of claim 1, further comprising an ultrasonic sealer or thermal sealer comprising retractable jaws positioned above the container holder and configured to seal at least one of a proximal end and a distal end of the hollow elongated tube.

19. The system of claim 1, wherein the first chamber includes one or more drains in a top portion thereof through which an overflow of the second amount of cryogenic liquid from the removable container flows into the first chamber.

20. The system of claim 1, wherein the elongated tube holder is configured to transfer the elongated tube into the container, and to transfer the elongated tube containing the sample holder therein out of the container.

21. A system for cryocooling biological samples, the system comprising:
a Dewar containing an insulated first chamber having an upper portion and a lower portion, the lower portion holding and directly contacting a first amount of a cryogenic liquid;
a container holder mounted inside the first chamber and having sidewalls in direct contact with the cryogenic liquid within the lower portion of the first chamber, the container holder including a high thermal conductivity metallic material;
a removable container inside the first chamber and positioned within and removable from the container holder, the removable container having an exterior surface shaped and sized to match an interior surface of the container holder such that the exterior surface is in direct contact with the interior surface, the removable container forming a second chamber holding a second amount of the cryogenic liquid in thermal contact with the first amount of the cryogenic liquid through the sidewalls of the container holder, wherein the cryogenic liquid in the removable container is not in fluid contact with the cryogenic liquid in the first chamber;

a sample holder with opposing first and second ends and an aperture adjacent the second end that is spanned by a thin polymer film on which a sample is supported;

a sample wand that holds and transfers the sample holder with the sample;

a translation stage to which the sample wand attaches;

a sample holder enclosure formed of a low thermal conductivity polymeric material; and a sample holder enclosure gripper that holds the sample holder enclosure within the second amount of the cryogenic liquid inside the removable container and in an orientation to accept the sample holder, wherein the translation stage is operable to vertically translate the sample holder from an initial position, located above the first chamber, to a final position, located within the sample holder enclosure with the sample holder enclosure in the removable container with the second amount of the cryogenic liquid such that the sample is fully immersed in the cryogenic liquid.

\* \* \* \* \*